United States Patent
Cameron et al.

(10) Patent No.: US 7,340,534 B2
(45) Date of Patent: *Mar. 4, 2008

(54) SYNCHRONIZATION OF DOCUMENTS BETWEEN A SERVER AND SMALL DEVICES

(75) Inventors: Brian A. Cameron, Moweaqua, IL (US); Paul J. Rank, San Jose, CA (US); Akhil K. Arora, San Jose, CA (US); Herbert T. Ong, Cupertino, CA (US); Mingchi S. Mak, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 10/090,893

(22) Filed: Mar. 5, 2002

(65) Prior Publication Data
US 2003/0172113 A1 Sep. 11, 2003

(51) Int. Cl.
*G06F 15/16* (2006.01)
(52) U.S. Cl. ............... 709/246; 709/203; 709/217; 709/219
(58) Field of Classification Search ........ 709/203, 709/204, 217, 219, 223, 224, 227, 246; 707/5, 707/10, 201, 203
See application file for complete search history.

(56) References Cited

U.S. PATENT DOCUMENTS

| | | | |
|---|---|---|---|
| 5,228,123 A | 7/1993 | Heckel | |
| 5,239,466 A * | 8/1993 | Morgan et al. | 715/512 |
| 5,701,472 A | 12/1997 | Koerber et al. | |
| 5,928,329 A * | 7/1999 | Clark et al. | 709/227 |
| 5,961,590 A * | 10/1999 | Mendez et al. | 709/206 |
| 6,023,708 A | 2/2000 | Mendez et al. | |
| 6,094,684 A | 7/2000 | Pallmann | |
| 6,151,606 A | 11/2000 | Mendez | |
| 6,243,705 B1 | 6/2001 | Kucala | |
| 6,308,201 B1 * | 10/2001 | Pivowar et al. | 709/214 |

(Continued)

FOREIGN PATENT DOCUMENTS

WO 02/19096 3/2002

OTHER PUBLICATIONS

"Psion Synchronizing and Converting", pp. 1-9, see http://www.ericlindsay.com/epc/sisync5.htm.

(Continued)

*Primary Examiner*—LaShonda Jacobs
(74) *Attorney, Agent, or Firm*—Robert C. Kowert; Meyertons, Hood, Kivlin, Kowert & Goetzel, P.C.

(57) ABSTRACT

Converting document formatted for use on servers to and from documents formatted for use on small devices, including synchronizing two or more versions of the document. A user may edit documents formatted for use on small devices and the documents may be synchronized with documents on the server to keep the documents up to date. In one embodiment, an n-way merge process may restore document formatting, styles and/or data features that may have been lost from one or more documents when converting from an office format to a small device format. In one embodiment, the server may provide an office productivity environment, and the documents on the server may be office documents.

36 Claims, 12 Drawing Sheets

U.S. PATENT DOCUMENTS

| | | | |
|---|---|---|---|
| 6,341,291 | B1 | 1/2002 | Bentley et al. |
| 6,343,313 | B1 | 1/2002 | Salesky et al. |
| 6,457,065 | B1 | 9/2002 | Rich et al. |
| 6,470,358 | B1 * | 10/2002 | Beyda et al. ............... 707/201 |
| 6,549,944 | B1 | 4/2003 | Weinberg et al. |
| 6,601,108 | B1 | 7/2003 | Marmor |
| 6,643,652 | B2 | 11/2003 | Helgeson et al. |
| 6,671,701 | B1 | 12/2003 | Chouinard |
| 6,708,221 | B1 | 3/2004 | Mendez et al. |
| 6,720,985 | B1 | 4/2004 | Silverbrook et al. |
| 6,725,421 | B1 | 4/2004 | Boucher et al. |
| 6,810,405 | B1 | 10/2004 | LaRue et al. |
| 2002/0073236 | A1 | 6/2002 | Helgeson et al. |
| 2002/0111995 | A1 | 8/2002 | Mansour et al. |
| 2002/0141442 | A1 * | 10/2002 | Plain et al. ................ 370/466 |
| 2002/0194388 | A1 | 12/2002 | Boloker et al. |
| 2003/0041095 | A1 | 2/2003 | Konda et al. |
| 2003/0154238 | A1 | 8/2003 | Murphy et al. |
| 2003/0172168 | A1 | 9/2003 | Mak et al. |
| 2003/0182450 | A1 | 9/2003 | Ong et al. |
| 2005/0055420 | A1 | 3/2005 | Wyler |

OTHER PUBLICATIONS

"PsiWing 1", pp. 1-2, Jan. 17, 1998, see esp. http://www.psion.com/computers/psionscpsiwin.1.html.

Search Report GB 0305045.7, mailed Jul. 24, 2003, 3 pages.

"Approaches to Adding Persistence to Java," Moss, Hosking, 1996, research.sun.com/research/forest/UK.Ac.Gla.Dcs.PJW1.Eliot_Moss2_ps.ps.

"Python and Java: The Best of Both Worlds," Hugunin, 1997, sunsite.informatik.rwth-aachen.de/python/workshops/1997-10/proceedings/hugunin.ps.

"SOPHIA: Providing Basic Knowledge Services with a Common DBMS," Abernethy and Altman, 1998, sunsite.informatik.rwth-aachen.de/Publications/CEUR-WS/Vol-10/paper1.ps.

Emmerich Schwarz et al., "Markup Meets Middleware," www.cs.ucl.ac.uk/staff/W.Emmerich/publications/FTDC99/m3.pdf, 1999, (6 pages).

Altinel and Franklin, "Efficient Filtering of XML Documents for Selective," www.cs.umd.edu/users/altinel/./pub/vldboo.pdf, 2000, (12 pages).

Sahuguet, Azavant, "WysiWyg Web Vrapper Factory (W4F)," db.cis.upenn.edu/DL/www8/www8.ps.gz, (22 pages).

Lettieri, P., et al., "Advances in Wireless Terminals," Personal Communications, IEEE, vol. 6, Issue 1, Feb. 1999, pp. 6-19.

Miah, T., et al., "Mobile Workers: Access To Information On The Move," Computing & Control Engineering Journal, vol. 8, Issue 5, Oct. 1997, pp. 215-223.

Bisdikian, C., et al., "WiSAP: A Wireless Personal Access Network for Handheld Computer Devices," Personal Communications, IEEE, vol. 5, Issue 6, Dec. 1998, pp. 18-25.

* cited by examiner

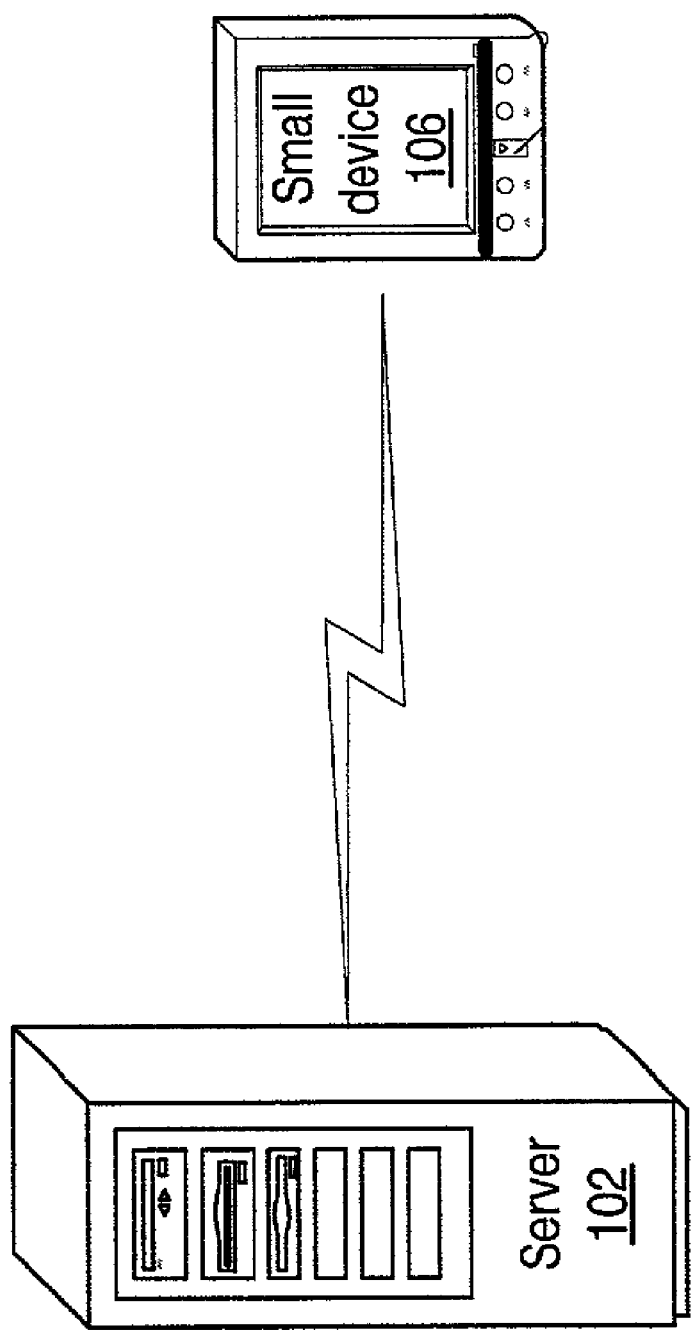

SYNCHRONIZATION OF DOCUMENTS BETWEEN A SERVER AND SMALL DEVICES

BACKGROUND OF THE INVENTION

1. Field of the Invention

This invention relates to networked computing systems, and more particularly to a system and method for synchronizing a document formatted for use on an office productivity server with the same document formatted for use on small devices.

2. Description of the Related Art

Office productivity solutions typically include a suite of office applications hosted by one or more server systems and accessible by users to create, modify and save office application-specific documents on one or more servers. Typically, the users access the office productivity suite through devices such as other servers, desktops, workstations, and other at least moderately powerful devices that allow the office application-specific documents to be accessed in the same or similar format as that in which they are stored on the server(s). Documents are typically stored on the server, and transferred to the other devices so that they can be edited. The documents may then be synchronized back to the original document on the server. While office productivity systems typically are implemented as client/server systems, such systems may also be implemented in other environments such as single-machine environments and peer-to-peer systems.

Small devices may include, but are not limited to, handheld devices, PDAs (Personal Digital Assistants), cell phones (e.g. MIDP (Mobile Information Device Profile) compliant cell phones), "smartphones," etc. Manufacturers of exemplary small devices include, but are not limited to: Palm, Psion, Microsoft, Compaq, Hewlett-Packard, Sharp, Casio and Sony. Smartphones include, but are not limited to, the Nokia Communicator, the Handspring Treo and the Samsung Smartphone. Small devices are typically used for personal information manager (PIM) types of applications such as maintaining schedules, keeping names and phone numbers, simple calculations, taking notes, and, with a modem or other mechanism for accessing a network via a wired or wireless connection, exchanging e-mail and getting information from the Web. Typically, only small quantities of record-oriented data, such as Personal Information Manager (PIM) data, are synchronized between a stand-alone computer and small devices.

Typically, it is not possible to run a complete office application on small devices, due to limited resources such as memory, storage, processing capabilities, and limitations of the operating systems. Additionally, office productivity data is typically not record-oriented, whereas PIM data is record-oriented. Record boundaries make the data relatively easy to compare and merge during synchronization of the data between the server and the small device.

SUMMARY OF THE INVENTION

Embodiments of a system and method for converting document formatted for use in an office productivity environment to and from documents formatted for use on small devices, and for synchronizing two or more versions of the document, may allow the user to edit documents on small devices or workstations and to synchronize the documents with office documents on a server to keep them up to date. In one embodiment, an n-way merge algorithm is utilized to restore document formatting, styles and/or data features that may be lost when converting one or more documents from an office format to a small device format.

In an office productivity system according to one embodiment, a server may provide one or more office productivity applications to clients of the system. The server may store office documents formatted according to one or more formats supported by the one or more office productivity applications and accessible to clients of the office productivity system using one or more of the office productivity application(s).

In one embodiment, small devices may be clients of the office productivity system. Small devices may include, but are not limited to, handheld devices, PDAs (Personal Digital Assistants), cell phones, etc. In general, any small, mobile, device that provides computing and information storage and retrieval capabilities for personal or business use may be classified as a small device. A small device may include one or more applications that may be used to view and edit small device versions of the office documents converted to a format suitable for the small device environment. Since a small device typically has limited resources such as memory, storage, processing capabilities, and operating system capabilities, to edit an office productivity document on the small device, it may be necessary to convert the document from a format used in the office productivity environment to a format that is suited for use on the small device. Certain data formats of office documents may not be supported on small devices due to the typically limited resources of small devices.

In one embodiment, one or more office documents may be converted by a converter mechanism and downloaded to a small device, and the small device may be uncoupled from the system/network and used for portable viewing and/or editing of the document(s) in one or more formats suitable for use by application(s) on the small device. In one embodiment, one or more small device applications may each require a specific converter to convert a document form for use in an office productivity environment to and from a document format for use by the application on small devices.

In one embodiment, the small device may be reconnected to the system/network and the document(s) may be uploaded to the office productivity system and converted to office document(s) by converter mechanism. After conversion, any changes to the document resulting from editing on the small device may be detected and merged with the original office document(s) by a merger process. In one embodiment, to synchronize an office document with a (possibly modified) small device document, the small device document may be converted back into the office document format and merged with the original office document. In another embodiment, both the small device document and the original office document may be converted into an interim format for synchronization. The merged document, in the interim format, may then be converted into one or more of the original office document format, the small device document format, or one or more other document formats which may be supported on the small device or server.

During the synchronization process, the server and/or small device may determine and notify the other of changes in the document, if any, that have occurred on their ends. Changes may include, but are not limited to, document additions, deletions and modifications. After notification, the server and/or small device may update their copy of the document to reflect the changes and thus synchronize the copies of the document. One embodiment may allow only the changed portion of the document, up to and including the entire document, to be sent. In other embodiments, the entire document is sent. Connection between the small device and the server may be made through a variety of mechanisms, including wireless mechanisms (e.g. wireless modems) and wired connections (e.g. a cradle or other device for coupling the small device to a desktop or server). The connection is typically, though not necessarily, initiated from the small device.

Some embodiments of the synchronization and conversion process may allow office documents to be accessed and modified on the server while being accessed and modified on a small device such as a PDA. In one embodiment, an office document may be accessed from two or more different platforms. Multiple users on one or more of the different platforms may access the office document, with the document being converted to a small device format for access on small devices. The document may be changed on any of the platforms by any of the users. In these embodiments, two or more versions of the document may be merged to maintain synchronization of the documents on two or more of the platforms. As an example, an original office document may have been accessed on the server after the last synchronization of the document with a small device. If the office document has been changed, then an n-way merge (in this example, a two-way merge) may be performed to synchronize the office document on the server with the small device document on the small device.

While this application generally describes various embodiments of a system and method for converting documents formatted for use in an office productivity environment to and from documents formatted for use by applications executable on small devices, it is noted that the system and method may be applied to converting documents to and from other formats and other kinds of devices. The system and method described herein are not specific to any device, nor are they specific to small devices, but are applicable to any of a wide range of computing devices, from small devices, to desktop systems, laptops and other portable computing devices, workstations, servers, mainframes, and even supercomputers.

BRIEF DESCRIPTION OF THE DRAWINGS

FIG. 1B illustrates a small device 106 coupling directly to a server 102 in an office productivity environment according to one embodiment;

Figure 1A:
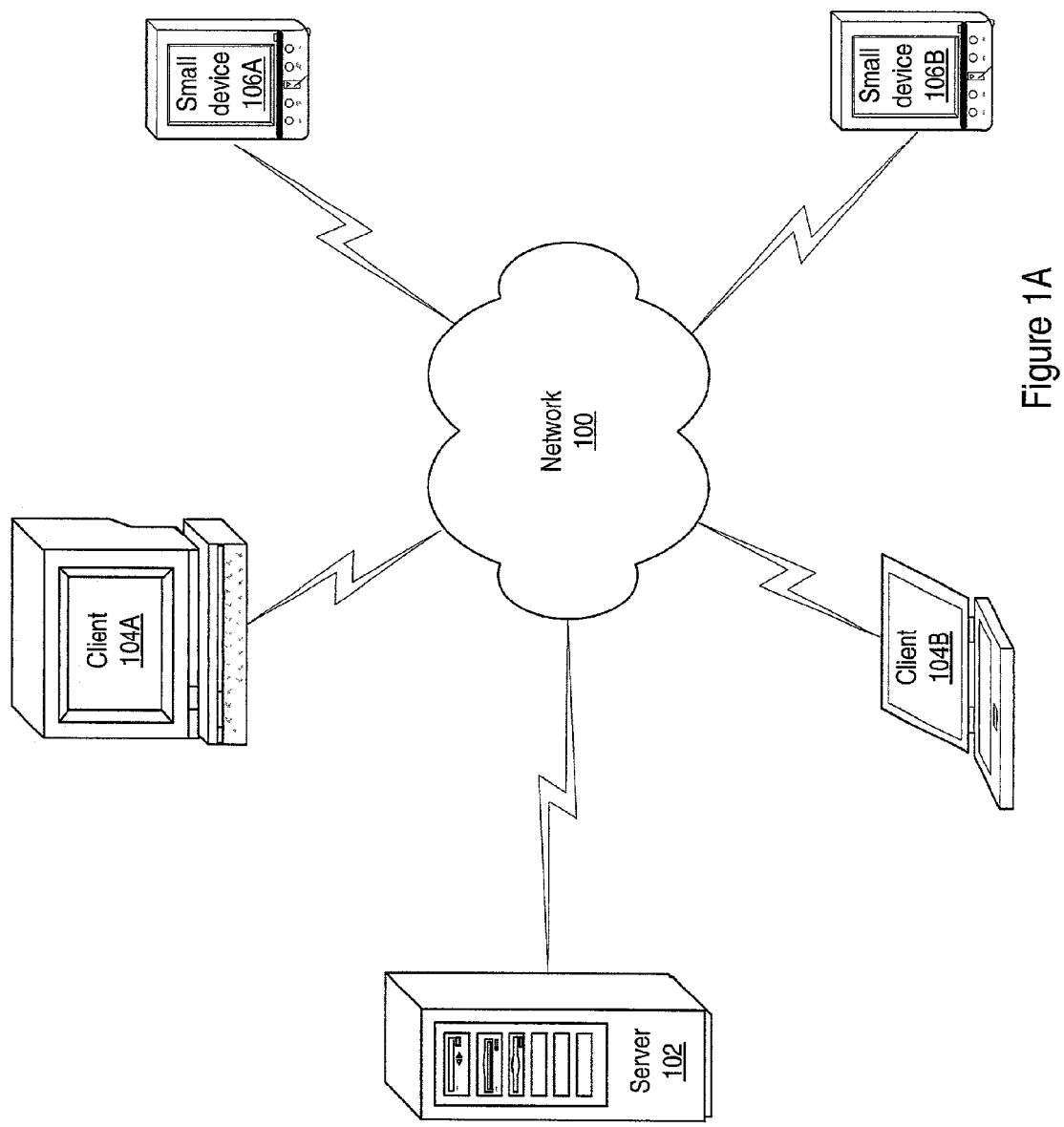
FIG. 1A illustrates an exemplary office productivity environment according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for converting a document formatted for use in an office productivity environment (typically, but not necessarily, a client-server environment) to a document formatted for use on small devices, and for synchronizing two or more versions of the document, is described. Embodiments allow the user to edit documents on small devices or workstations and to synchronize the documents with office documents on a server to keep them up to date. Versions of a document may be modified on one or more clients, and may also be modified on the server. The task of merging modified documents into a single document, or optionally leaving them as separate documents, (with possible user interaction) may be referred to as an n-way merge. In one embodiment, the n-way merge process may restore document formatting, styles and/or data features that may be lost when converting from an office format to a small device format.

While this application generally describes various embodiments of a system and method for converting documents formatted for use in an office productivity environment to and from documents formatted for use by applications executable on small devices, it is noted that the system and method may be applied to converting documents to and from other formats and other kinds of devices. The system and method described herein are not specific to any device, nor are they specific to small devices, but are applicable to any of a wide range of computing devices, from small devices, to desktop systems, laptops and other portable computing devices, workstations, servers, mainframes, and even supercomputers.

For example, an embodiment may be used within a single device (e.g. a desktop computer) to convert documents between two or more different formats. As another example, an embodiment may be used to convert office documents on a server to and from a format useable by an application executing within a desktop computer or workstation. As another example, consider the case of a music composer dealing with MIDI files. Compositions may be stored on a server, and synchronized with MIDI composer application on a handheld device to be modified. Periodically, the composer may synchronize the handheld device with the server. The composer may also access and modify compositions from a PC in a home studio. In yet another example, a video (e.g. MPEG) stream may be modified on a device (e.g. desktop, laptop or handheld). A diff/merge of a video stream may be performed using an embodiment as described herein. A multi-pass iterator for the video stream may, for example, iterate in x and y dimensions of an image, and then along the time axis, or the other way around.

Note that embodiments may be used to convert and synchronize documents for use with editor programs, executable within more powerful devices, which may not support one or more format features of an office document. Examples of such editors include, but are not limited to, UNIX vi and pico, Microsoft Notepad and Wordpad, and edlin. Thus, in this document, the term "small device" may also include the notion of such editors.

FIG. 1A illustrates an exemplary office productivity environment according to one embodiment. A server 102 may be coupled to one or more client devices 104 (e.g. workstations, desktop computers, computer terminals, etc., collectively herein referred to as "workstations") and one or more small devices 106 (which also are "clients" of the office productivity environment) via a network 100. Note that an office productivity environment may include a plurality of servers 102. The servers 102 may be any of various types of devices including, but not limited to workstations, personal computers, desktop computers, laptop computers, mainframes up to and including supercomputers. Network 100 may be any type of wired or wireless computer network including a Local Area Network (LAN), Wide Area Network (WAN), intranet, Internet or a combination of various types of wired and wireless computer networks.

A small device 106 may be portable, and thus may not always be connected to the office productivity system. Small devices 106 may include, but are not limited to, handheld devices, PDAs (Personal Digital Assistants), cell phones (for example MIDP (Mobile Information Device Profile) compliant cell phones), smartphones, etc. In general, any small, mobile, device that provides computing and information storage and retrieval capabilities for personal or business use may be classified as a "small device." Manufacturers of exemplary small devices include, but are not limited to: Palm, Psion, Microsoft, Compaq, Hewlett-Packard, Sharp, Casio and Sony. Smartphones include, but are not limited to, the Nokia Communicator, the Handspring Treo and the Samsung Smartphone.

FIG. 1B illustrates a small device 106 coupling directly to a server 102 in an office productivity environment according to one embodiment. Small device 106 may couple to the server 102 using any of various mechanisms available on small devices including wired and wireless mechanisms.

Figure 2:
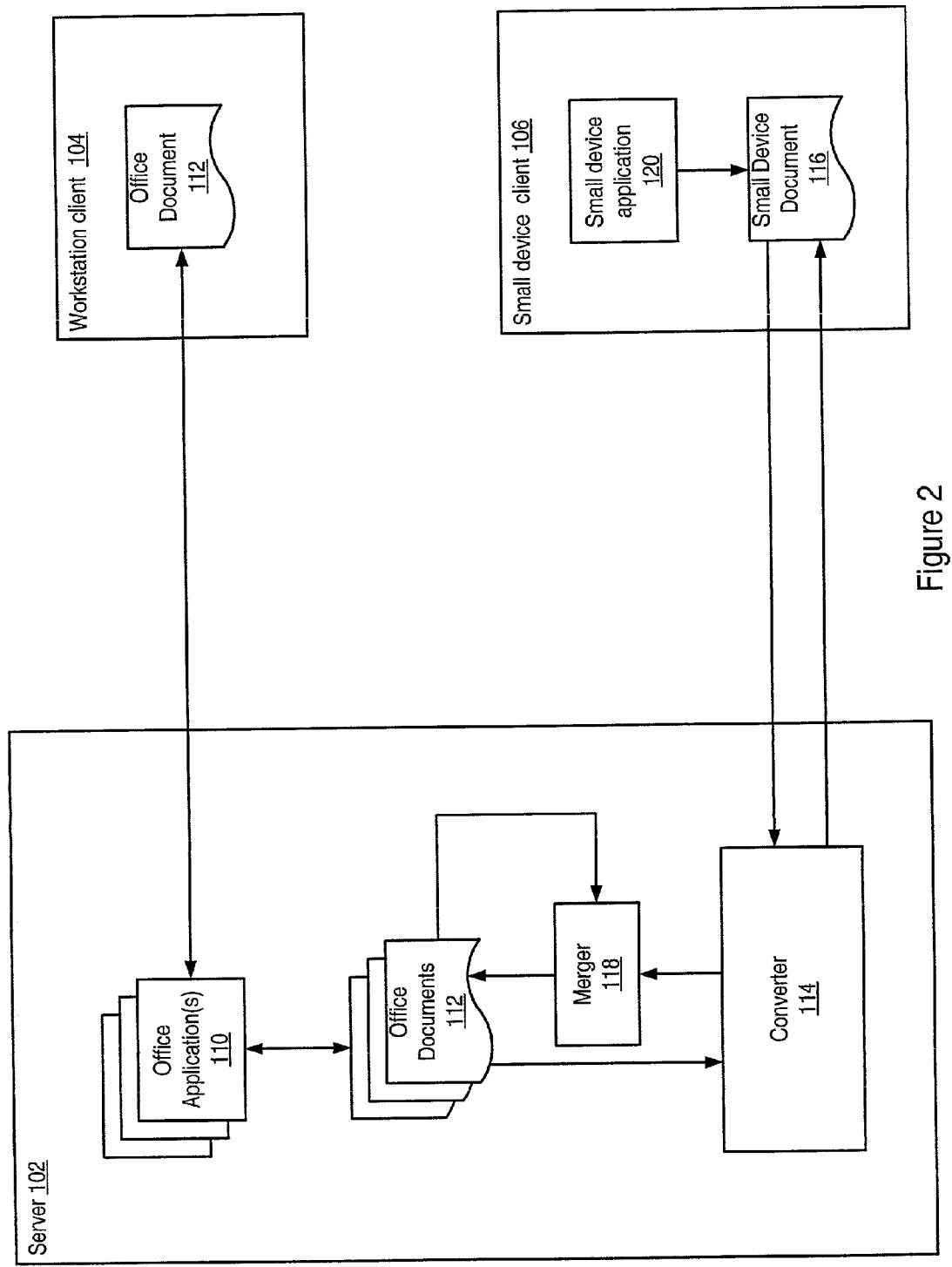
FIG. 2 illustrates an exemplary architecture of an office productivity system according to one embodiment.

FIG. 2 illustrates an exemplary architecture of an office productivity system according to one embodiment. Server 102 may provide one or more office productivity applications 110 to the workstation clients 104 of the office productivity system. Server 102 may include storage media for storing office documents 112 formatted according to one or more formats supported by the one or more office productivity applications 110 and accessible to workstation clients 104 of the office productivity system using one or more of the office productivity application(s) 110. In this document, these documents may be interchangeably referred to as "office productivity documents," "office documents," or simply "server documents."

When accessing the office documents 112, workstation clients 104 typically may use the office productivity applications, and thus may access an office document 112 in the format supported by one or more of the office applications 110. However, small devices 106 typically have limited resources and thus may not support execution of the office applications 110, and also may not support one or more of the document features supported by the office applications 110 such as lists, graphics and spreadsheets. The small devices 106 may include one or more applications 120 that may be used to view and edit small device versions of the office documents 116 converted to a format suitable for the small device environment.

Since a small device 106 typically has limited resources such as memory, storage, processing capabilities, and operating system capabilities, to edit an office productivity document on the small device, it may be necessary to convert the document from a format used in the office productivity environment to a format that is suited for use on the small device. Certain data formats of office documents may not be supported on small devices due to the typically limited resources of small devices. For example, to reduce the size of the document, images or other memory-consuming data may be removed from the document before providing the document to the small device. As another example, some data formats such as list formats may not be supported by applications executable within the small device that may be used to edit the document. The formatted data may be extracted from the server-specific document and formatted in a manner suitable for editing using the application on the small device before providing the document to the small device. For example, list format data may be converted to a series of paragraphs.

In one embodiment, one or more office documents 112 may be converted by a converter mechanism 114 and downloaded to a small device 106, and the small device 106 may be uncoupled from the system/network and used for portable viewing and/or editing of the document(s) 116 in one or more formats suitable for use by application(s) 120 on the small device 106. In one embodiment, one or more small device applications 120 may each require a specific converter 114 to convert a document form for use in an office productivity environment to and from a document format for use by the application on small devices 106.

In one embodiment, the small device 106 may be reconnected to the system/network and the document(s) 116 may be uploaded to the office productivity system and converted to office document(s) 112 by converter mechanism 114. After conversion, any changes to the document resulting from editing on the small device may be detected and merged with the original office document(s) by a merger 118. In one embodiment, to synchronize an office document 112 with a (possibly modified) small device document 116, the small device document 116 may be converted back into the office document format and merged with the original office document 112. In another embodiment, both the small device document 116 and the original office document 112 may be converted into an interim format for synchronization. The merged document, in the interim format, may then be converted into one or more of the original office document format, the small device document format, or one or more other document formats which may be supported on the small device or server. In one embodiment, office documents 112 may be formatted using a markup language (e.g. HTML or XML), and an office document 112 from the server 102 may be converted from the markup language format to a small device document 116 formatted according to a format suitable for use by one or more applications on the small device 106, and later may be converted back again to the markup language format for synchronizing with the server version of the office document 112. In one embodiment, the conversion is performed on the server and not on the small device.

One embodiment may convert as much format and/or data as possible from an office document 112 to a format supported on a small device 106. For example, when converting a spreadsheet, the cell value, all associated formulas and, in one embodiment, at least a portion of style information may be converted for display and possible editing on the small device 106. Changes made on the small device document 116 may then be merged back into the original office document 112. One embodiment supports restoring all formats and/or data that may have been lost during the conversion from the office document format to the small device format when converting the small device document 116 back to the office document 116.

In one embodiment, the small device format may be plain text, i.e. there are no supported styles or structures. Also, lists, list items, paragraphs, headings, etc. may not be supported by the small device format. Some small device formats may support bookmarks.

During the synchronization process, the server 102 and/or small device 106 may determine and notify the other of changes in the document, if any, that have occurred on their ends. Changes may include, but are not limited to, document additions, deletions and modifications. After notification, the server 102 and/or small device 106 may update their copy of the document to reflect the changes and thus synchronize the copies of the document. One embodiment may allow only the changed portion of the document, up to and including the entire document, to be sent. In other embodiments, the entire document is sent. The synchronization process may occur over any of a variety of networks, including wired and wireless networks.

In some embodiments, the document synchronization processes may be performed without human input, thus allowing the synchronization process to be driven from small devices 106 where the facilities to perform conflict resolution may not be available. Other embodiments may allow for human input into the synchronization process. For example, if there is a document conflict (e.g. the document has been modified on both the server and client, or on two or more clients), an interface may be provided to allow a user to choose which of two or more conflicting changes are to be used in the synchronized document. As another example, during merging, heuristics may be used to determine formatting or other information for modified document content. In one embodiment, two or more options for merging particular modified content may be presented to the user, and the user may select one of the presented options to be applied to the modified content.

In one embodiment, the conversion and synchronization process may not start an office process on the server, or alternatively may require and launch only a portion of the office productivity stack on the server, and thus may be resource efficient and not generate as much load on the server when compared to prior art conversion and synchronization mechanisms which typically require the entire office productivity stack.

This may allow the conversion and synchronization processes to be scalable, i.e. to continue to function as the context changes in size or volume (e.g. as the system expands and the number of users, servers, documents, and other components increase).

Some embodiments of the synchronization and conversion process may allow office documents 112 to be accessed and modified on the server 102 while also being accessed and modified on a small device 106 such as a PDA. In one embodiment, an office document 112 may be accessed from two or more different platforms (e.g. workstations, Palms, other PDAs, etc.). Multiple users on one or more of the different platforms may access the office document 112, with the document being converted to one or more small device formats for transfer to the small devices 106. The document 112 may be changed on any of the platforms by any of the users. In these embodiments, two or more versions of the document may be merged to maintain synchronization of the documents on two or more of the platforms. As an example, an original office document 112 may have been accessed on the server 102 (for example from a workstation 104 or alternatively from another small device 106) after the last synchronization of the document with a small device 106. If the office document 112 has been changed, then an n-way merge (in this example, a two-way merge) may be performed to synchronize the office document 112 on the server 102 with the small device document 116 on the small device 102.

Synchronization Setup and Operation

In one embodiment, office documents 112 on the server 102 may be accessed from both workstations 104 and small devices 106 via a server-side document synchronization component or application. In this embodiment, there may be a synchronization client application for the workstation clients 104 and a synchronization client application for the small devices 106. A synchronization client application may provide the client-side end of the synchronization and transport mechanism between the client (e.g. small device 106 or workstation 104) and the office productivity server 102. On a small device 106, when the client application receives converted documents from the server 102, it may store the documents on the small device 106, for example in a database, for access by one or more applications 120 on the small device 106. Connection between the small device 106 and the server 102 may be made through a variety of mechanisms, including wireless mechanisms (e.g. wireless modems) and wired connections (e.g. a cradle or other device for coupling the small device 106 to a desktop or server 102). The connection is typically, though not necessarily, initiated from the small device 106.

In one embodiment, when started, the client application may send information, (e.g. user name, login ID, password, device capabilities and information, client ID, etc), to the server 102 for client authentication and other purposes. In one embodiment, the server 102 may provide the client with a list of available file formats, which may be determined by which converters are currently installed or available on the server 102. In one embodiment, the file formats may be specified as MIME (Multipurpose Internet Mail Extensions) types. For any given file format, there may be one or more applications 120 on the small device 106 that are capable of reading that file format (for example, the "doc" format). The client application may allow the user to associate one or more of the available file types with an application 120 on the small device 106, so that the client application knows which particular application 120 is to receive documents of that particular file format.

In one embodiment, a user of a small device 106 may specify a directory of documents (for example, a "database" of documents associated with a particular client-side application) to be synchronized. In one embodiment, the user may select individual documents from one or more directories to be synchronized. In one embodiment, a content hash mechanism for computing a condensed representation of a data file may be used in determining if a document on the small device 106 has changed, and in determining what changes need to be sent to the server 102 for synchronization. An example of a hash mechanism that may be used is the Secure Hash Algorithm (SHA-1) as described in the Federal Information Processing Standards Publication 180-1 (FIPS PUB 180-1) issued by the National Institute of Standards and Technology. One skilled in the art will recognize that any of a variety of hash algorithms may be used. The documents may then be sent to the server 102 for synchronization.

In one embodiment, the entire document may be sent from the small device 106 to the server 102 during the synchronization process. In another embodiment, only changed portions of the document may be sent from the small device 106 to the server 102 during the synchronization process.

On the server 102, the documents may be converted and merged with associated office documents. The output documents of the conversion and merge process may be in any of a variety of document formats. In one embodiment, the output of the conversion and merge processes may be a markup language document (e.g. an XML document). In one embodiment, on the server 102, one or more of the merged documents may be converted back into the small device format and returned to the small device 106 to complete the synchronization process between the small client 106 and the server 102.

In one embodiment, synchronization may include adding office document(s) 112 to a synchronization list on the server 102 to specify that the documents are to be transferred to a particular small device 106 during the next synchronization of the small device 106 to the server 102. In one embodiment, the server 102 may provide a list of synchronizable documents to the small device 106, and a user of the small device may select and/or deselect documents to be synchronized with the server 102. For each document, a document synchronization list may include, but is not limited to, at least one of the following items: a document name, a small device database name, a server file name (or alternatively a URL), and indicators to determine if the document is present on the server 102, present on the client, and needs to be synchronized.

In one embodiment, the server 102 and the small device 106 may each maintain a list of synchronizable documents. During the synchronization process, the two devices may synchronize their document synchronization lists so that they both include the same information. The documents lists may then be used to display the list of documents to the small device user so that the user can select which documents are to be synchronized.

One embodiment may provide a mechanism to convert a set of documents (e.g. specified by the user) from one small device format to another. For example, a user may specify documents in a particular office document format be converted to a small device format A. A set of documents may then be synchronized to the small device, and one or more of the documents may be modified on the small device. The user may then change the specification for the documents in the particular office document format to be converted to a small device format B. In situations like this, all of the set of documents in format A may be synchronized with the server, deleted, and replaced with the synchronized documents converted to format B.

Client/Server Document Synchronization

When transferring a server document 112 to a small device 106, the document 112 may be converted from an office document format to a specific small device application format. Small device applications may differ in their support for at least some document formatting features. A small device application may not support one or more of the document format features of the office document format supported by one or more of the office applications. Some of these unsupported features may be advanced features, such as charts in spreadsheet documents, while others may be more basic, such as italic fonts in word processing documents. If there are unsupported document format features in an office document converted to a small device application format, the conversion process is "lossy"; i.e. some information (e.g. formatting information) may be "lost" or left out of the converted document. As an example, a small device format may not support lists, so when converting the document the list items may each be converted to an individual paragraph.

For a first-time synchronization, if the office document(s) 112 to be transferred exist on the server 102 but not on the small device 106, the office document(s) 112 may be converted to an appropriate small device format and transferred to the small device 106. After the transfer, users on the small device 106 may access the small device document 116, and users on the server 102 may access the server version of the document 112. If a document 116 exists on the small device 106 but not on the server 102, the small device document 116 may be transferred to the server 102 and converted to the appropriate office format. After the transfer, users on the small device 106 may access the small device document 116, and users on the server may access the server version of the document 112.

In one embodiment of the synchronization process, if a document on a workstation is unmodified and the server document is unmodified, no synchronization is required. If the document on the workstation is unmodified and the server document is modified, the modified server document may be transferred to the workstation, overwriting the document on the workstation. If the document on the workstation is modified and the server document is unmodified, the modified workstation document may be transferred to the server, overwriting the document on the server. If the document on the workstation is modified and the server document is also modified, the modified workstation document may be synchronized with the modified server document as described below.

The following describes several scenarios of synchronizing documents between a small device client and a server according to one embodiment. If a document on a small device is unmodified and the server document is unmodified, no synchronization is required. If the document on the small device is unmodified and the server document is modified, the modified server document may be transferred to the small device, overwriting the document on the small device.

If the document on the small device is modified and the server document is unmodified, the modified small device document may be synchronized with the unmodified document on the server as described below. If the document on the small device is modified and the server document is modified, the modified small device document may be synchronized with the modified server document as described below.

Synchronizing Modified Client Documents with Unmodified Server Documents

Figure 3A:
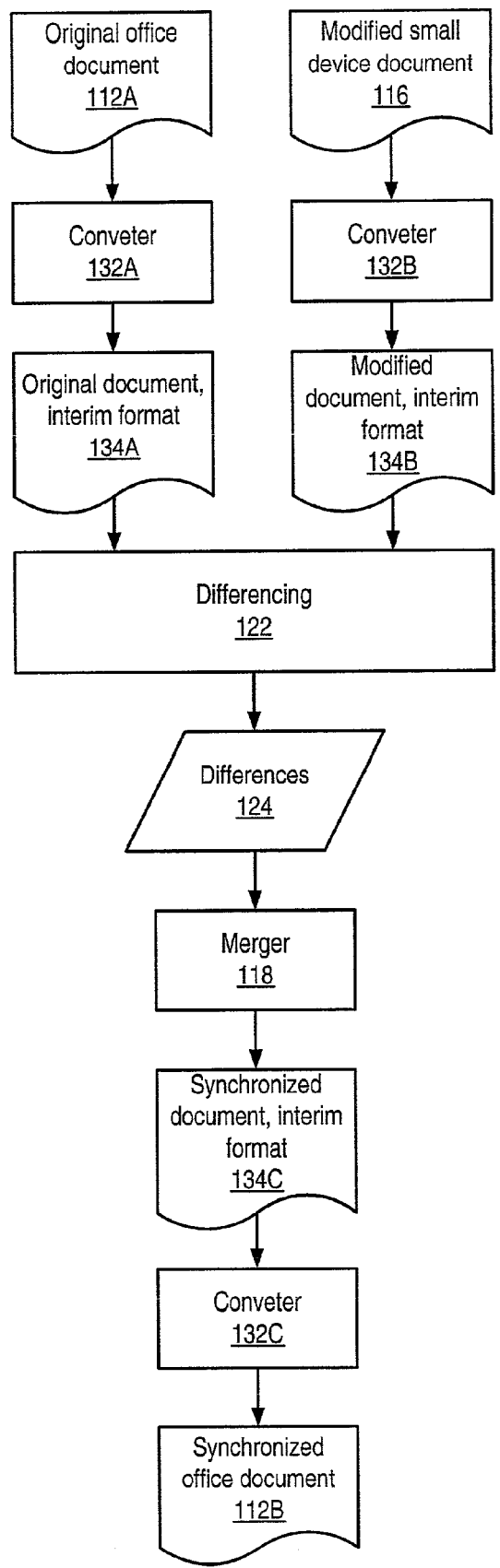
FIG. 3A illustrates synchronizing an office document on a server with a modified small device document according to one embodiment.

FIG. 3A illustrates synchronizing an office document on a server with a modified small device document according to one embodiment. In one embodiment of the synchronization process, if a document exists on both the small device 106 and the server 102 and is modified on the small device 106 but unmodified on the server 102 (since the last synchronization), the document 116 may be transferred from the small device 106 to the server 102 and synchronization performed to determine and apply the changes made on the small device 106 to the original office document 112A to produce a synchronized office document 112B.

In one embodiment, the original office document 112A and the modified small device document 116 may be converted by one or more converters 132 to an interim format that is used by differencing 122 and merger 118. In this example, converter 132A converts original office document 112A and produces the original document in an interim format 134A, while converter 132B converts modified small device document 116 and produces the modified document in an interim format 134B. Other embodiments may use one converter 132 to convert both documents to an interim format.

The original document 134A in interim format and the modified document 134B in interim format may be compared by a differencing mechanism 122 to determine the changes in the modified small device document 116. Differencing 122 may output differences 124 describing one or more changes or differences between the original document 134A and the modified document 134B. In one embodiment, differences 124 may include a list of difference objects. These objects represent the differences between the two versions of the document. In one embodiment, merger 118 may apply differences 124 to original document 134A in interim format to generate a synchronized document in interim format 134C. In another embodiment, a new document in interim format 134C may be created and unchanged content from the original document 134A and changed content from modified document 134B may be merged into the new document. In one embodiment, the synchronized document 134C may then be converted by one or more converters 132 to produce a document in a different format. In this example, the synchronized document is converted by converter 132C into a synchronized office document 112B. In one embodiment, the interim synchronized document 134C may be converted to one or more other formats as specified by the user.

In one embodiment, the original office document 112A may be replaced with the synchronized document 112B, including changes made on the small device 106. The synchronized office document 112B may then be converted to the appropriate small device format and transferred to the small device 106 to complete the synchronization process. This allows the restoration of features to the synchronized document 112B that may have been lost when previously converting the original office document 112A from an office format to the format of the small device document 116.

In one embodiment, a user may optionally choose to perform conflict resolution on the original office document 112A and the synchronized document 112B to allow the user to optionally override or change any formatting decisions made in the merge process (e.g. heuristically determined formatting decisions).

Figure 3B:
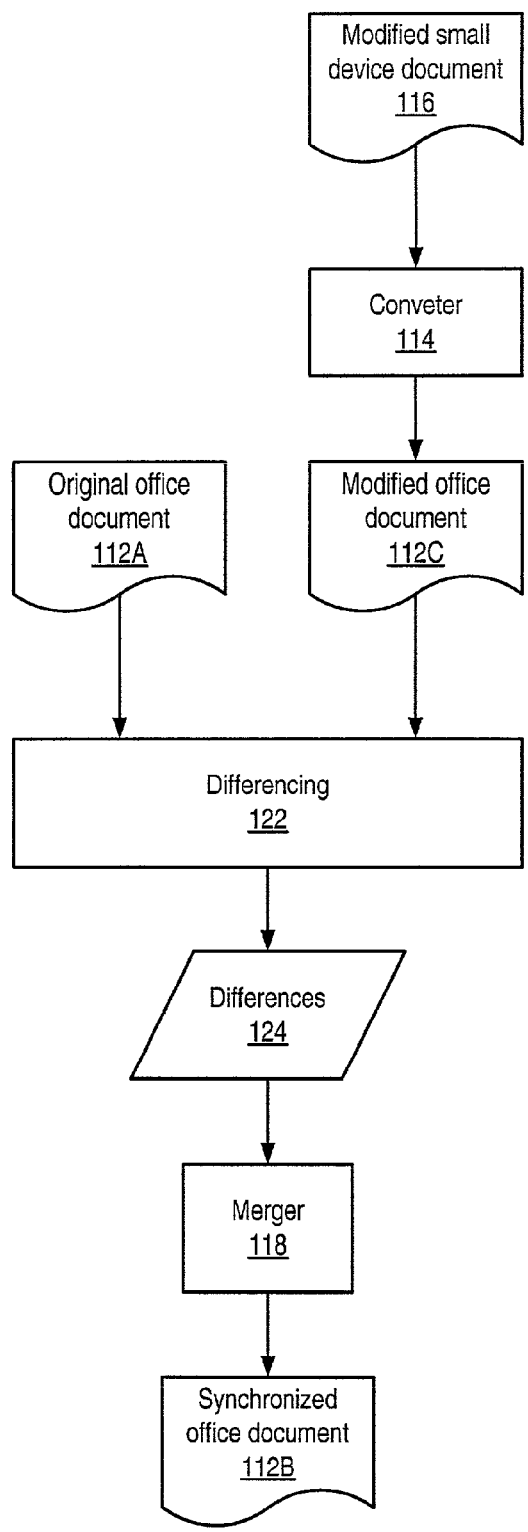
FIG. 3B further illustrates synchronizing an office document on a server with a modified small device document according to one embodiment.

FIG. 3B further illustrates synchronizing an office document on a server with a modified small device document according to one embodiment. In this embodiment, the original office document 112A is in the same format as the "interim" format. Therefore, in this embodiment, it is not necessary to convert the office document 112A to an interim format. Note that converter 114 is used instead of converter 134 to signify that the output of this conversion is a modified office document 112C. Thus, in one embodiment, the same converter 114 may be used to convert office documents to small device documents when transferring documents to the small device as is used during the conversion/merge process. Also note that the output of the merger 118 is a synchronized office document 112B and thus does not need to be converted from an interim format into the office document format of office document 112A. In one embodiment, the differences may be merged into the original office document 112A, and thus document 112B is document 112A in this embodiment.

Figure 4:
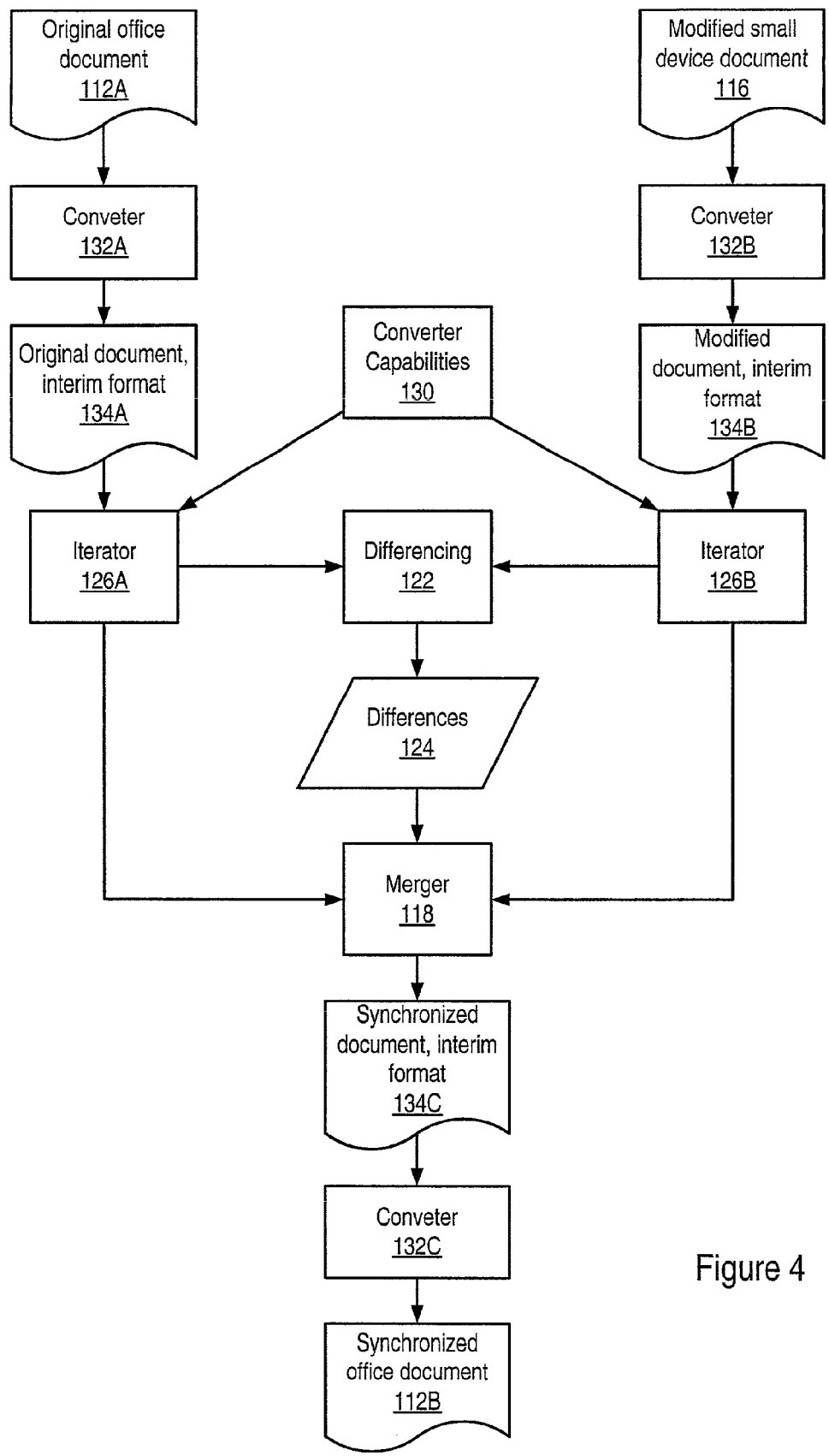
FIG. 4 further illustrates synchronizing an office document on a server with a modified small device document according to one embodiment.

FIG. 4 further illustrates synchronizing an office document on a server with a modified small device document according to one embodiment. In one embodiment, iterators 126 may be used by the differencing mechanism 122 and the merger module to access the input documents.

In one embodiment, the original office document 112A and the modified small device document 116 may be converted by one or more converters 132 to an interim format that is used by differencing 122 and merger 118. In this example, converter 132A converts original office document 112A and produces the original document in an interim format 134A, while converter 132B converts modified small device document 116 and produces the modified document in an interim format 134B. Other embodiments may use one converter 132 to convert both documents to an interim format.

The original document 134A in interim format may be provided to an iterator 126A and the modified document 134B in interim format may be provided to an iterator 126B. In one embodiment, iterator 126A may iterate the original document 134A and pass portions of the document to the differencing mechanism 122 while iterator 126B is concurrently iterating the modified document 134B and passing corresponding portions of the modified document 134B to differencing 122. In another embodiment, the differencing mechanism 122 accesses the iterators to iterate through the documents in a standard fashion.

In one embodiment, the functionality of the iterators and converters may be combined. For example, converter 132A and iterator 126A may be combined into a single object, and converter 132B and iterator 126B may be combined into a second object.

Differencing 122 may produce differences 124 describing one or more changes or differences between the original office document 112A and the modified small device document 116. In one embodiment, differences 124 may include a list of difference objects. These objects represent the differences between the office document 112A and the small device document 116.

One embodiment may include a converter capabilities 130 which indicates to the iterators what tags (e.g. XML tags) in the interim format are supported by the small device format.

The converter capabilities may also describe how the tags are supported. For example, if the "rich" (e.g. office) format supports two different kinds of tables and the "lossy" (e.g. small device) format only supports one kind of table, then both types of "rich" tables may be translated to the one kind of "lossy" table. A conversion without merge of such a lossy document back to the rich document may cause all the tables to be converted to one of the two rich format table types rather than preserving the appropriate table type. In this situation the two rich table tags are both supported, but translated. Such translations may be described in the converter capabilities 130. This is a different kind of "loss" than whether a tag is supported or not (which may be a simpler situation). The merger may also be used to resolve this type of lossy situation. Other embodiments may use other mechanisms to identify what is supported, and/or how they are supported, in the device format (if, for example, the interim format is not tag-based).

The iterators 126 may be used by merger 118 to access the interim documents 134A and 134B during the merge process. Merger 118 may generate a synchronized interim document 134C. In one embodiment, merger 118 may determine document location information for changes and pass the information and the corresponding changes to an iterator 126, which may handle the actual application of the changes to the original document 134A. In one embodiment, the iterator may be iterator 126A. In one embodiment, the merger 118, for each difference in differences 124, instructs the iterator 126 (e.g. iterator 126A) to perform the add/delete/change operation specified in the difference. In other words, the iterator 126 performs the actual modification of the original document.

The synchronized document 134C in interim format may then be converted by converter 132C to produce synchronized office document 112B. In one embodiment, the original office document 112A may be replaced with the synchronized document 112B, including changes made on the small device 106. The synchronized office document 112B may then be converted to the appropriate small device format and transferred to the small device 106 to complete the synchronization process.

Note that, in one embodiment, the original office document 112A is in the same format as the "interim" format. Therefore, in this embodiment, it is not necessary to convert the office document 112A to an interim format. In this embodiment, the same converter 114 may be used to convert office documents to small device documents when transferring documents to the small device as is used during the conversion/merge process. Also note that, in this embodiment, the output of the merger 118 is a synchronized office document 112B and thus does not need to be converted from an interim format into the office document format of office document 112A. In one embodiment, the differences may be merged into the original office document 112A, and thus document 112B is document 112A in this embodiment.

As an example of restoring features when converting from a small device document format to an office document format, consider the case where a small device format does not support lists. When converting the document from the office document format to the small device document format, the list items may each be converted to an individual paragraph. When converting the document back to the office document format, the list features may be restored from the paragraphs by using the original formatting information of the server document. In one embodiment, if the paragraphs have been modified (e.g. if text has been added after one of the paragraphs), the conversion process may use heuristics to interpret how to convert the modified paragraphs.

In one embodiment of the synchronization process, if a document exists on both the small device 106 and the server 102 and is modified on the server 102 but not on the small device 106, the modified office document 112 may be converted to the appropriate small device format and transferred to the small device 116, overwriting the small device document 116 on the small device 106.

Figure 5:
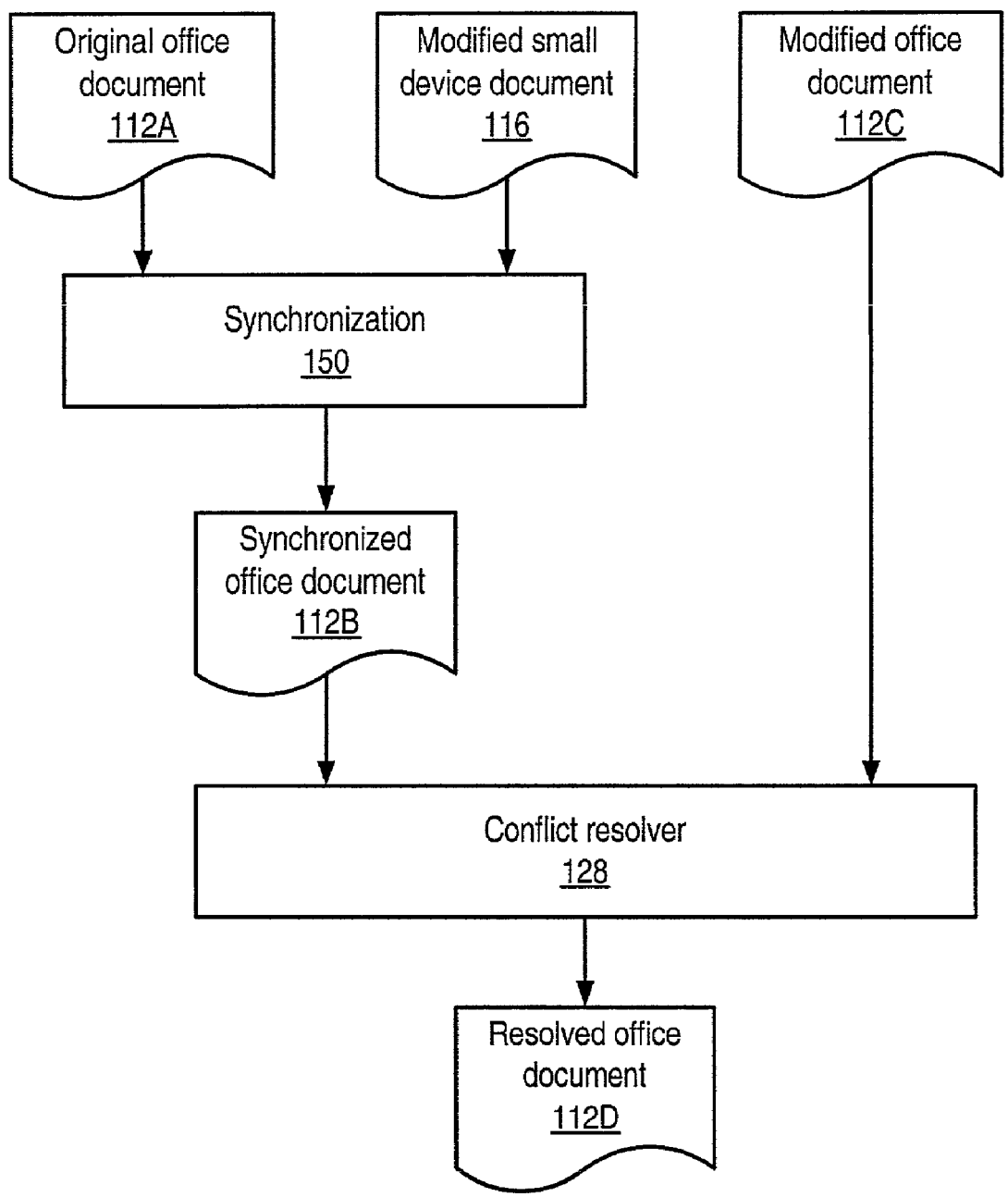
FIG. 5 illustrates synchronizing a modified office document on a server with a modified small device document according to one embodiment.

FIG. 5 illustrates synchronizing a modified office document on a server with a modified small device document according to one embodiment. In one embodiment, if a document exists on both the small device 106 and the server 102 and is modified on both the server 102 and the small device 106, conflicting changes in the two documents may need to be resolved. A modified office document 112C, for example, may have been generated during synchronization of another version of the office document 112 with a modified version of the document from a different client (e.g. another small device client or a workstation client).

The small device document 116 is transferred to the server 102 and passed to a synchronization mechanism 150 with the original office document 112A. Synchronization 150 produces a synchronized office document 112C incorporating the changes in the small device document 116. Embodiments of the synchronization mechanism illustrated in FIGS. 3 and 4 may be used for synchronization 150. Synchronization 150 may include, but is not limited to, converting the small device document 116 and merging the converted document with the original office document.

The synchronized office document 112B and the modified office document 112C may then be passed to conflict resolver 128 to resolve conflicts, if any, between the two documents. Conflicts may be resolved by any of a number of methods as described later in this document, including automated methods, manual methods, and a combination of automatic and manual methods. Conflict resolver 128 outputs resolved office document 112D. In one embodiment, resolved office document 112D may replace the original office document 112A and be provided to the small device to complete the synchronization of the document between the small device and the server. Resolved office document 112D may be converted to one or more other formats, including the small device format of small device document 116.

In one embodiment, if there are no conflicting changes between the synchronized office document 112B and the modified office document 112C, the two documents may be merged using synchronization 150 to generate the resolved office document 112D.

The process illustrated in FIG. 5 may be performed in a chain or a series (an n-way merge) if there are multiple versions of the document to be resolved. In one embodiment of an n-way merge, the conflict resolver may be passed one or more modified office documents and/or one or more modified small device documents. In another embodiment, the conflict resolver may be called in a chain or series. In other words, the output of a two-way merge (as shown in FIG. 5) may be the modified office document for the next iteration. For example, there may be another modified version of the office document 112. In one embodiment, the other modified version of the office document and the resolved office document 112D may be passed to conflict resolver 150 to resolve conflicts, if any, between the two documents. This process may be performed for any number of documents. After resolution is complete, the final version of the resolved document may be provided to any clients that need to be synchronized with the server version of the document.

Other embodiments may use other methods to synchronize two or more modified versions of a document. For example, in one embodiment, two modified documents may be passed to synchronization 150, and conflict resolution may be integrated with the differencing and merger processes. In this embodiment, if a conflict is detected during the differencing process, the conflict may be resolved by the conflict resolution mechanism to determine which of the conflicting changes to merge.

Figure 6:
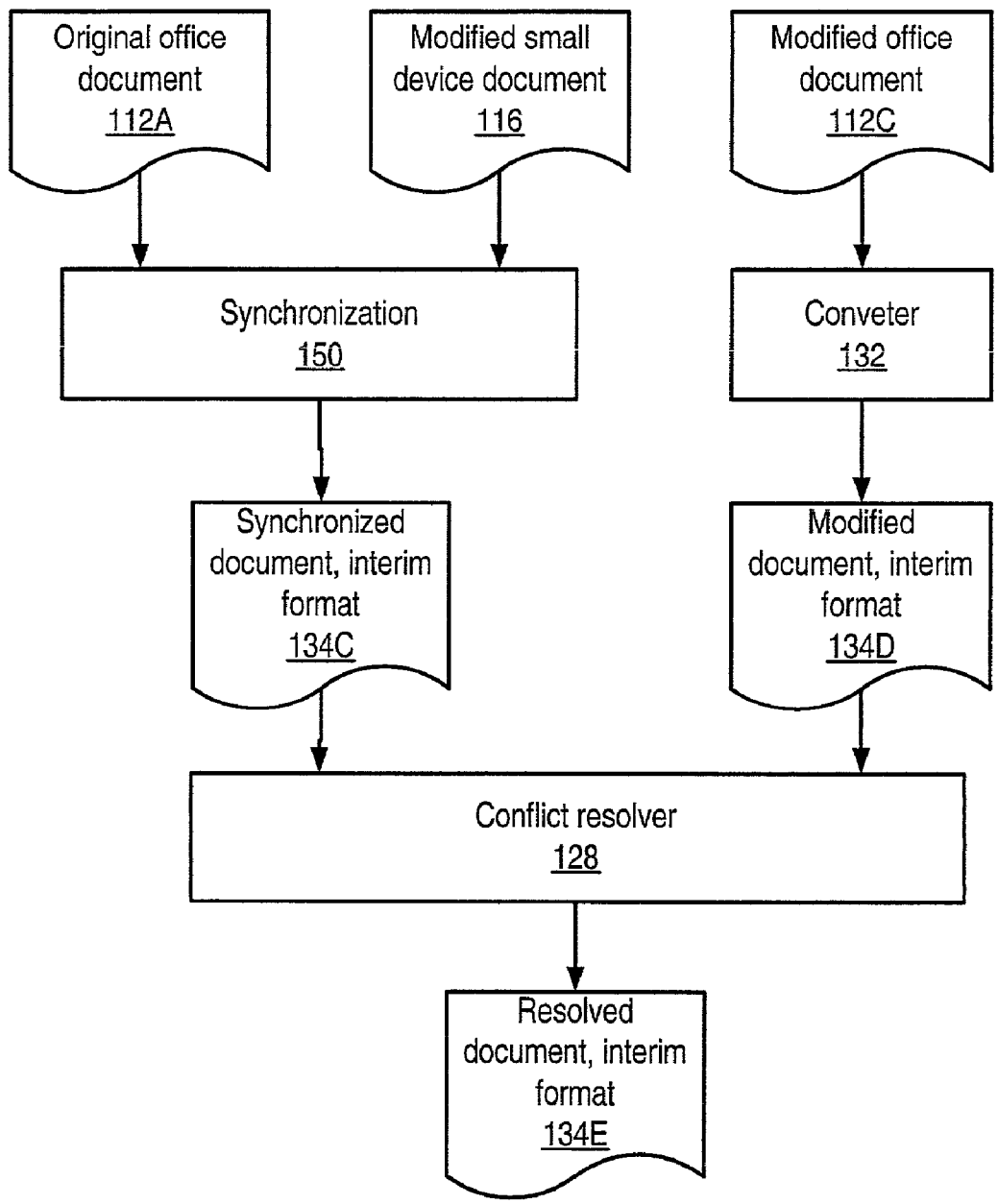
FIG. 6 further illustrates synchronizing a modified office document on a server with a modified small device document according to one embodiment.

FIG. 6 further illustrates synchronizing a modified office document on a server with a modified small device document according to one embodiment. In this embodiment, the output of synchronization is synchronized document 134C in an interim format used by synchronization 150 when merging the original office document 112A and the modified small device document 116, as described in FIG. 4. Modified office document 112C is passed to a converter 132, which generates modified document 134D in interim format. Synchronized document 134C and modified document 134D are then passed to the conflict resolver 150, which generates resolved document 134E in interim format. Resolved document 134E may then be converted to one or more other formats, including the office format of the original office document 112A and the small device format of small device document 116.

In one embodiment, rather than converting the modified office document 112C, the synchronized document 134C output from synchronization 150 may be passed to a converter 132 to convert the document into the same format as the modified office document 112C prior to conflict resolution.

Synchronizing Modified Client Documents with Modified Server Documents

A similar case is presented when a modified document is transferred from a small device or a workstation to a server if the server document has been modified since the document was originally copied to the client. Small devices and workstations may be collectively referred to as "clients." The server document may be a synchronized version of the document from a workstation or small device, for example. The following describes embodiments of methods for synchronizing modified client documents with modified server documents.

Whether the client is a small device or a workstation, the changes made on the client document since the last synchronization need to be determined, as well as the changes made on the server document since the last synchronization session with the same client. In one embodiment, to determine these changes and synchronize the documents, an n-way merge of the modified documents and the original (as of the time of the last synchronization with the client) server document may be performed, for example as illustrated in FIGS. 5 and 6. To perform the n-way merge, the original document that was sent to each client may be preserved on the server. As FIG. 5 and 6 illustrate, the original office document (as sent to a given client) is an input into the synchronization process. In one embodiment, a source code or revision control system (e.g. SCCS, RCS, CVS, etc.) may be used to maintain the original versions of a document sent to each client. In one embodiment, the source code control system may use a branching method to maintain the versions of the document.

If the changes in the modified client document do not conflict with the changes in the modified server document, the changes may be merged into an updated document. This updated document may be synchronized on both the client and the server after the synchronization. Note that if the client is a small device, the client document may be converted to a small device format and thus may be "lossy" in that it unsupported document features and/or content may be dropped.

If one or more changes in the modified client document conflict with changes in the modified server document, the conflicts may be resolved using one or more of the following methods. In one embodiment, if the client and/or server document is heavily modified, the entire content of the original document may be replaced with the newly edited content.

In one embodiment, a mechanism may be provided to allow a user to manually resolve differences and/or conflicts between two documents via user input to the mechanism. In one embodiment of this mechanism, the two documents may be presented on a display and conflicting portions of the document may be indicated, for example through highlighting or underlining. The user may then select portions that are to be kept and/or deleted in the new version of the document. After the user performs conflict resolution, the server and/or the small device versions of the document may be replaced with the new version. Backup copies of the replaced documents may be kept in one embodiment.

Small devices such as PDAs are usually not adequate to allow a user to manually resolve conflicts in versions of a document because of limited resources such as memory and screen size. One embodiment may implement a set of policies for use during the synchronization of office documents and small device documents to handle conflicting changes in an office document 112 and a corresponding small device document 116. The user may be provided with one or more policy options when both the server and client document have been modified and need to be synchronized. The user may select from among the one or more policy options during the synchronization process. The policy option may then be applied to any documents being synchronized if the server document and client document have both been modified and there are conflicting changes.

In one embodiment, conflict resolution may be at least partially automated so that at least in some situations conflict resolution may be done without human interaction. In one embodiment, the user may define a set of policies regarding how to deal with certain common situations, and the conflict resolver may use the policies in determining how to automatically resolve certain conflicts. For example if in one modified document a series of items is bulleted and in another they are not, a policy may dictate that bullets are preferred.

Some embodiments may allow the user to set up "tag based" or "capabilities based" policies for dealing with at least some conflicts. In these embodiments, user input may be needed for at least some conflict resolution, for example in situations where heuristics may not be able to determine from among two or more possible formats for modified content.

Embodiments may include one or more of, but are not limited to, the following user-selectable policy options:
  Create a new server document based on the client version.
    Two documents will now exist and the user may manually merge the documents, if desired. This option may use the at least partially automated conflict resolution method described above.

Not do anything with the documents on either side and to report to the user that both sides have been modified and the documents are not synchronized. In order to resolve this, user can either pick another option or perform a manual operation, e.g. manually deleting or renaming the client or server document.

Overwrite the server document with the client document (merged with the original document and converted to the appropriate format), or optionally overwrite the client document with the server document (converted to the appropriate format).

Treat either the modified server document or the modified client document (merged with the original document and converted to the appropriate format) as a new document (or alternatively both documents).

In one embodiment, for conflicting parts of the documents, the changed portions of the merged client document may be used, and the conflicting changed portions of the modified server document may be deleted. In one embodiment, the deleted portions of the document may be indicated in document change tracking information. Alternatively, the changed portions of the modified server document may be used, and the conflicting changed portions of the merged client document may be deleted and tracked. Either or both of these embodiments may be used as a policy option.

For example, consider a document with the following sentence: "The Cat is white." Assume that on the server the sentence has been changed to: "The Cat is green," and on the client the sentence has been changed to: "The Cat is red." Assuming the server side changes are considered the original and the client side changes considered the modification, after merging, in the merged document the sentence would read "The Cat is red". During conflict resolution, the user may be presented with the two modified versions of the document (the merged version and the modified original document.) The user may then choose between the two modifications. If the user chooses "The cat is red", the synchronized version on the server will read "The cat is red", but change tracking may inform the user that "green" has been changed to "red." Note that, in some embodiments, the conflict resolution may be automated, and thus at least some choices between conflicting changes may not require user input during the conflict resolution.

When the user next accesses the server document (or a version of the document on a client where change tracking is available), the user may choose which version of the conflicting changes to keep. If chosen on the server, this generates a changed server document that needs to be merged with the client document during the next synchronization. If the user has not modified the client document, or if the client document is modified and the changes do not conflict with the new server changes, then a non-conflicting merge may be performed. If the user has modified the client document so that there are conflicting changes, a new "change-tracked" version of the document may be generated and the procedure repeated.

In one embodiment, changes in the server document and changes in the client document may be tracked. In one embodiment, in order to determine changes in the server and/or client document, a copy of the server document as last synchronized with the client document may be kept. In one embodiment, the file name may include the original filename, the name of the small device the document is synchronized with, and optionally an extension identifying the office document type. This backup file may be created as a sibling of the original document.

In one embodiment, the server may keep a copy of each document as originally provided to any client. During the merge process, the modified client document may be merged with the copy of the document kept by the server. In one embodiment, two or more clients may access a server document. The server may store different copies of the document, one for each client. These different copies may be different revisions or versions of the server document. If multiple clients modify the same document, the result of each merge between a modified client document and its associated original document may be passed through a conflict resolver to resolve the conflicting changes that were made on each client.

In one embodiment, a source-control versioning mechanism or revision control system (e.g. SCCS, RCS, CVS, etc.) may be used to store versions of the document provided to the clients, for example for disk space efficiency. In some embodiments, the source code mechanism of "forking" (supported in SCCS, RCS, CVS, etc.) may be used. In another embodiment, the server may manage backup copies of the specific documents that were provided to the clients.

In one embodiment, another backup file may be created on the server. This backup copy of the office document 112 may be used, for example, during conflict resolution when the user has access to a workstation or other client device of the server that has the necessary resources to let the user manually resolve conflicting changes, if necessary. In one embodiment, this file's name may include the original filename, an extension, and information identifying it as a server version of the file (e.g. "server"). This file may be updated when the original server document is updated and may be used during the n-way merge process in restoring formatting information that may have been lost during conversion to small device format. In one embodiment, only one version of a document is maintained on a small device (e.g. there are no backup copies on the device). During synchronization, an n-way merge may be preformed between a copy of a document on a small device and a backup copy of the document that was made when the file was originally transferred to the small device.

Document Conversion with Merging

During the conversion of a document from a format for use in an office productivity environment to a format for use on small devices, some information may be dropped from the document, for example if the information is not supported on the small device. Examples of information that may be dropped during conversion include, but are not limited to, formatting, graphics, styles, unsupported data types and embedded objects. For example, if a particular list format for data is not supported by an application on the small device, the data may be placed into paragraphs representing the items in the list. As another example, to save transmission bandwidth and/or to reduce the size of the document, some or all graphics (e.g. images and icons) may be dropped from the document. In one embodiment, dropped information such as graphics may be represented in the small device-formatted document by a marker or other indicator that may provide information about the dropped item(s), for example the location of the dropped item in the document and the type of information that was dropped from the location.

After a user modifies the document on the small device, the document, or alternatively only the changes in the document, may be converted and transferred to the original document on the server. If a simple conversion is done, information that was dropped from the document when converting to the small device format (e.g. formats, graphics, etc.) may be lost. One embodiment may provide a mechanism or mechanisms that may be used to merge the "lost" information from the original document with the changed document data returned from the small device.

The merging process may vary based on the changes made on a document, for example, whether a change is a content change, a structural change or a style change. In one embodiment, content changes may include one or more of, but are not limited to: adding, removing and/or replacing characters, words or sentences inside a paragraph, list or list item. In one embodiment, content changes may include one or more of, but are not limited to: adding, removing and/or replacing cell content (e.g. value, formula, and text). In one embodiment, structural changes may include one or more of, but are not limited to: adding, removing and/or replacing text across paragraphs, styles, or list items, removing characters, words or sentences inside a paragraph, list or list item, and replacing characters, words or sentences inside a paragraph, list, or list item. Style changes may include, but are not limited to, adding or removing bold, italics or underline from characters, words or sentences inside or across paragraphs or list items.

Some embodiments, as described below, may provide a framework that supports the plugging in of converter and/or merger modules that may allow code common to multiple converter and/or merger implementations to be shared. In some embodiments, document merging may be combined with the document conversion process to implement a combined document converter/merger pluggable module. Other embodiments may use other architectures than the plug-in module for the implementation of document converters and/or mergers. In these embodiments as well, the document conversion and merging functions may be combined or alternatively may be in separate modules.

In one embodiment of a document converter/merger mechanism, a document on a device such as a server or desktop system may be converted to a format readable and editable on a different device, for example a small device. The converted document may be transferred to the different device for editing. The edited document may be transferred back to the original device (e.g. server or desktop) for synchronization with the original document. After transferal, the edited document may be converted back to the original document format on the original device. The converted, edited document may then be analyzed to determine differences between the converted, edited document and the original, unedited document on the original device. The determined differences may then be applied to the original, unedited document on the original device, thus merging the changes made on the small device with the original document on the original device.

The above describes embodiments of the document converter/merger mechanism in terms of a networked environment such as a client/server environment, a peer-to-peer or other environment in which there may be multiple devices, one of which provides the documents for editing on another device. Note that, in some embodiments, the document conversion/merge mechanism may be used as a stand-alone mechanism, for example to convert and merge documents within a device. For example, a desktop user may have a converter/merger plug-in that is configured to convert documents from a format A to a format B and vice versa. The converter/merger mechanism may be used as a stand-alone mechanism to generate a copy of a document in format B from a document in format A. The document in format B may then be edited or otherwise modified using one or more applications that accept documents in format B for editing. The converter/merger mechanism may then be used as a stand-alone mechanism to convert the copy of the document back to format A, and then to detect and merge the changes into the original (format A) document.

In one embodiment, the document merge process may be performed recursively and/or two or more times in a sequence, using the same merger module or different merger modules, to handle different data types and/or for efficiency. For example, to handle different types of data, one merge may be run to handle text differences, and a second merge may be run to handle image differences (if there are images in the document to be merged). As another example, one merger may loop through text as a series of paragraphs to detect paragraphs in which there are differences. When a paragraph with differences is detected, another merger may be used to loop through that paragraph to detect sentences in which there are differences. For sentences with differences, yet another merger may be called to detect word-level differences in the sentence and to merge the word differences into the original document.

Some embodiments may use a reference format in the merge process. One embodiment may use a markup language (e.g. HTML, XML, etc.) format as the reference format. Documents in other formats (e.g. a document in a format for use in an office productivity environment and the same document in a format for use on small devices) may be converted to the reference format, and the comparison and merge performed on the reference format versions of the documents. The merged reference format document may then be converted to the appropriate office format and/or to the appropriate small device format to complete the synchronization process.

In one embodiment, a small device document may have been originally converted from an office document and transferred to the small device and may have been modified on the small device subsequent to the transfer. In one embodiment, an iterator may be used by the differencing module and the merge module to access a document. In one embodiment, the differencing module generates a list of difference objects. These objects represent the differences between an office document and a small device document. The merge module may receive the difference objects generated by the differencing module as input and create a merged office document. In one embodiment, formats or objects in the office document that are not supported in the small device format are not altered or removed from the office document. Changes made to the small device document are merged back into the office document in locations determined by the differencing module.

One embodiment may be capabilities based. Each converter may be aware of document tags (e.g. XML tags) it supports. In one embodiment, each converter module may specify converter capabilities indicating which office document formats or objects are supported for the particular small device format supported by the converter. The converter capabilities may also describe how the tags are supported. For example, if the "rich" (e.g. office) format supports two different kinds of tables and the "lossy" (e.g. small device) format only supports one kind of table, then both types of "rich" tables may be translated to the one kind of "lossy" table. A conversion without merge of such a lossy document back to the rich document may cause all the tables to be converted to one of the two rich format table types rather than preserving the appropriate table type. In this situation the two rich table tags are both supported, but translated. Such translations may be described in the converter capabilities. This is a different kind of "loss" than whether a tag is supported or not (which may be a simpler situation). The merger may also be used to resolve this type of lossy situation.

The converter capabilities information may be passed to the merge algorithm to inform the merge algorithm of what changes in a document in a format for use on small devices to merge back into the document in an office productivity format, and what in the original office productivity document should be preserved. In another embodiment, the capabilities may be hardcoded into the merger, and thus the capabilities do not need to be passed from the converter to the merger. In yet another embodiment, the capabilities may be stored in a file or database for access by the merger. In this embodiment, the capabilities may be modifiable.

In one embodiment, there may be several components in an implementation of the merge logic. These components may include iterators, differencing modules, and merge modules. In one embodiment, mergers that are satisfied with the functionality provided by an existing implementation may reuse one or more existing components. For example, to implement the merge logic for a small device word processor that is satisfied using a paragraph iterator, the iterator, differencing module, and/or the document merge module may not have to include much "custom" code.

In one embodiment, the differencing module accepts as input two series of one or more of any type of document object and outputs a difference array including information describing the differences in the two series. The merge algorithm accepts as input the difference array and the two series of one or more objects and merges the difference array in one of the two series. One embodiment of a differencing module may use a longest common sequence method to determine differences in portions of the documents. Other embodiments may use other methods to determine differences in the documents.

In one embodiment, an iterator may be provided that effectively abstracts the differencing module and the merge module from the document and that may allow multiple passes of differencing and/or merging to be performed. The differencing module and the merge module each may interface with the iterator. The iterator may provide an API that allows the calling module to manipulate objects in a document (e.g. move forward or backward over the objects, insert or remove objects, etc.)

In one embodiment, the iterator may apply the changes to the original document.

Different embodiments of the iterator may use different methods to perform the actual application of the changes. In one embodiment, the iterator may be called by the merger to insert/delete a document object in a certain position. The iterator uses its particular method to perform the actual insertion/deletion, abstracting the merger from the actual work of inserting/deleting an object. In one embodiment, the modification may be directly merged into the original document. In another embodiment, the modification may be merged into a working document which may be converted into the format of the original document after the merge process is completed and used to replace the original document. After the merge process, the modified server document may be converted to the appropriate small device format and transferred to the small device.

One embodiment may use iterative (mutli-pass) differencing for documents, where different passes difference the documents at different granularities. For example, to merge two text documents, a paragraph iterator may be used first to difference the paragraphs. If changes are detected in a paragraph, a sentence iterator may be used to difference the sentences in the paragraph. If changes are detected in a sentence, a word iterator may be used to perform word-level differencing. Alternatively, the sentence iterator may be left out, and if changes are detected in a paragraph, a word iterator may be used to perform word-level differencing. A similar mutli-pass differencing mechanism may be used for other types of documents. For example, spreadsheet documents may be differenced at the worksheet, row and cell levels by a multi-pass iterator.

One embodiment of a multi-pass iterator may allow different iterators to be used for different types of content in a document. For example, if a list is encountered in a text document, a list iterator may be used to determine differences in the list. Note that the list iterator may be multi-pass as well, and may use some of the same iterators (e.g. the word iterator) as other multi-pass iterators such as the word iterator. Thus, iterators may be combined in complex multi-pass iterator mechanisms to difference documents with a variety of content and/or formats.

Using multi-pass iteration may allow the merging of documents to be performed faster, as only the changed part of a document is passed to the next level of differencing. This avoids having to difference and merge every word of a document. Multi-pass iteration may also allow selective multi-pass differencing. For example, a paragraph may be differenced using a paragraph iterator, which may discover that the paragraph is a list/table. A different merge algorithm may be invoked to perform differencing and merging rather of doing a second-level word- or sentenced-based differencing of the paragraph.

One embodiment of the merge process may include multiple modules, for example differencing modules and merge modules. This may allow, for example, multiple passes of differencing with the postponement of merging until differencing is completed.

One embodiment may use heuristics in synchronizing office productivity data with a copy of the data formatted for use on a small device. For example, to merge an edited small device document 116 with an office document 112, the merger 118 may use heuristics, for example to decide what formatting should be used to merge items in the document. For example, if a new item appears in a list, heuristics may be used to determine if the new item is a list item. In one embodiment, for document formatting, indicators such as special characters (e.g. an asterisk (*)) may be used to indicate document objects and items such as the items in a list. When the document is being merged, the special character(s) may indicate to the merger 118 the type of item or object to be merged. In another embodiment, if new content is inserted into a list during editing on the small device 106, the content may be determined as a new list item or items by comparing the content of the list before and after the new content.

In one embodiment, heuristics may include comparing content and paragraphs. In one embodiment, heuristics may be used to decide which style(s) should be used. For example, attributes such as font attributes and style attributes may be compared to determine whether to use existing style/font attributes or to introduce new style/font attributes. In one embodiment, heuristics may include determining if any paragraphs and/or sentences have been moved. Paragraphs in the documents may be compared to determine if paragraphs have been moved or new paragraph insertion has been performed. In one embodiment, for spreadsheet data, heuristics may be used to determine unsupported content (e.g. objects, charts, and links) in the cells so that unsupported objects can be compared and maintained, as opposed to deleting the unsupported content during or after the merge. Heuristics may also be used for spreadsheets when comparing rows, columns and/or cells to detect moved or swapped rows, columns and/or cells, and may also be used for spreadsheets in maintaining objects, styles, and formatting.

As an example of using heuristics in the merge process, an office productivity document 112 including a list of data may be transferred to a small device 106 that does not support the list format. The conversion process may convert the list to a series of paragraphs. On the small device 106, the small device document 116 may be edited to add data after the paragraphs that represent the list. During synchronization of the data, as the data is converted back to the office productivity format, the synchronization mechanism may infer from the data if new data is intended to be part of the list. Heuristics may also be used, for example, in spreadsheet cell positioning and to maintain unsupported objects.

In one embodiment, user input may be needed to make some determinations. In this embodiment, the merged document and the original document may be passed through a conflict resolver to allow the user to override or change choices made by the heuristics of the merge process. The user may choose, for example, to revert to an original formatting choice. As an example, assume an item of text content in the "rich" office format of the original document reads "This word is <b>bold</b>", where the word "bold" is bolded (indicated by the <b> . . . </b> tags). If the lossy small device format does not support bolded text, in the small device document, the text will read, "This word is bold" with no words bolded. The user may modify the text to read, "This word is really bold". When this text is merged back into the original rich document, the merger may not be able to determine whether the word "really" and/or the word "bold" should be bolded. In situations like this where heuristics may not be able to determine from among two or more possible formats for modified content, the user may be prompted to make the decision. Some embodiments of a merger may also allow the user to set up "tag based" or "capabilities based" policies for dealing with such situations.

One embodiment may use heuristics during a conversion process for a new small device document 116 generated on a small device 106 and transferred to the server 102, for example to determine if the new document includes list information. For example, a new document 116 may include a series of paragraphs and heuristics may be used to determine the series of paragraphs are a list of items and format them into an office document 112 for the appropriate office application accordingly. Alternatively, the new document 116 may include indicators such as special characters that indicate formatting for associated content of the office document 112 during the conversion process.

Generic Conversion and Merging

One embodiment may use an open, generic conversion framework that allows developers (e.g. ISVs (Independent Software Vendors)) to develop plug-in custom conversion algorithms and/or merge algorithms (referred to as pluggable modules). Converting documents from the small device to the server-based documents may include converting the document from a small device format to an office format (or alternatively an interim format) and merging the converted document with a server-based version of the document (or alternatively the server-based version in an interim format). In one embodiment, document merging may be split into two processes including a document differencing process and a document merging process that may be implemented as separate modules, allowing multiple, independent passes of implementations of the differencing process and the merge process. Splitting the processes may also make it easier to develop custom merger algorithms. For example, developing a custom merge algorithm may involve writing custom differencing algorithms to work with an existing merger module, if existing differencing modules do not meet the requirements of the developer.

Figure 7A:
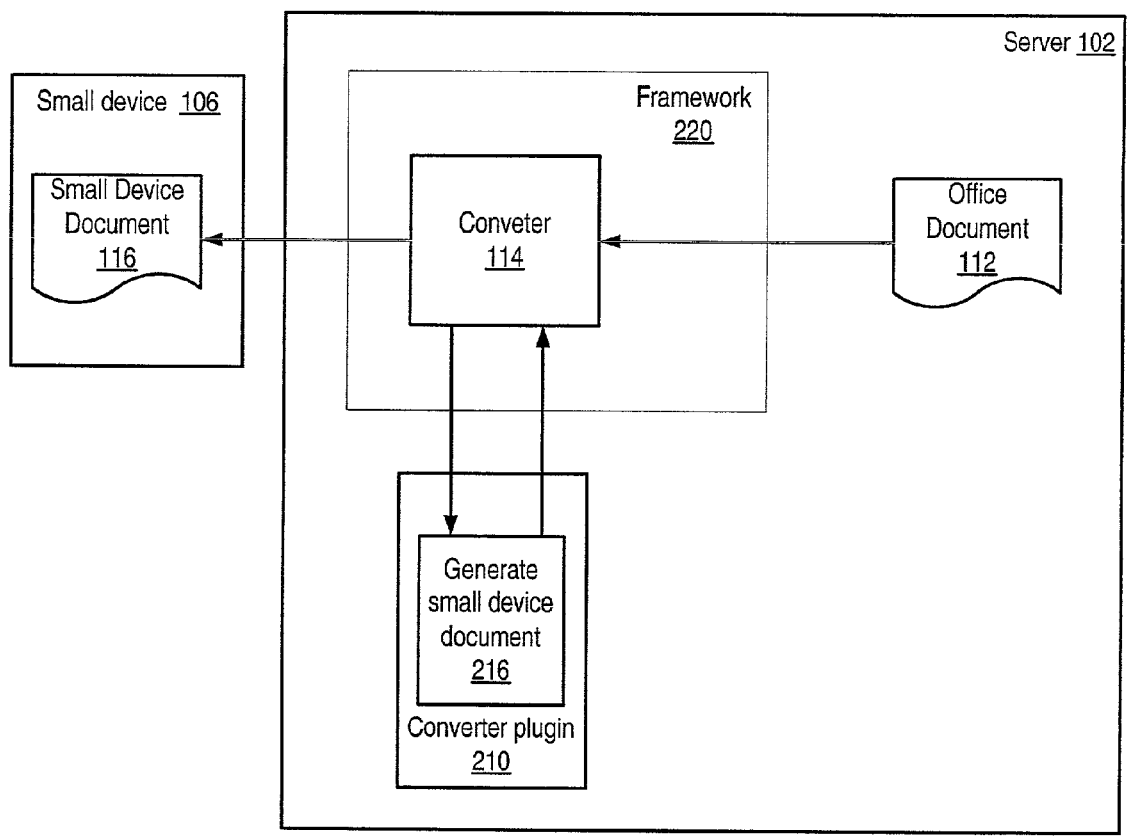
FIG. 7A illustrates a conversion framework for pluggable modules being used to convert an office document to a small device document according to one embodiment.
Figure 7B:
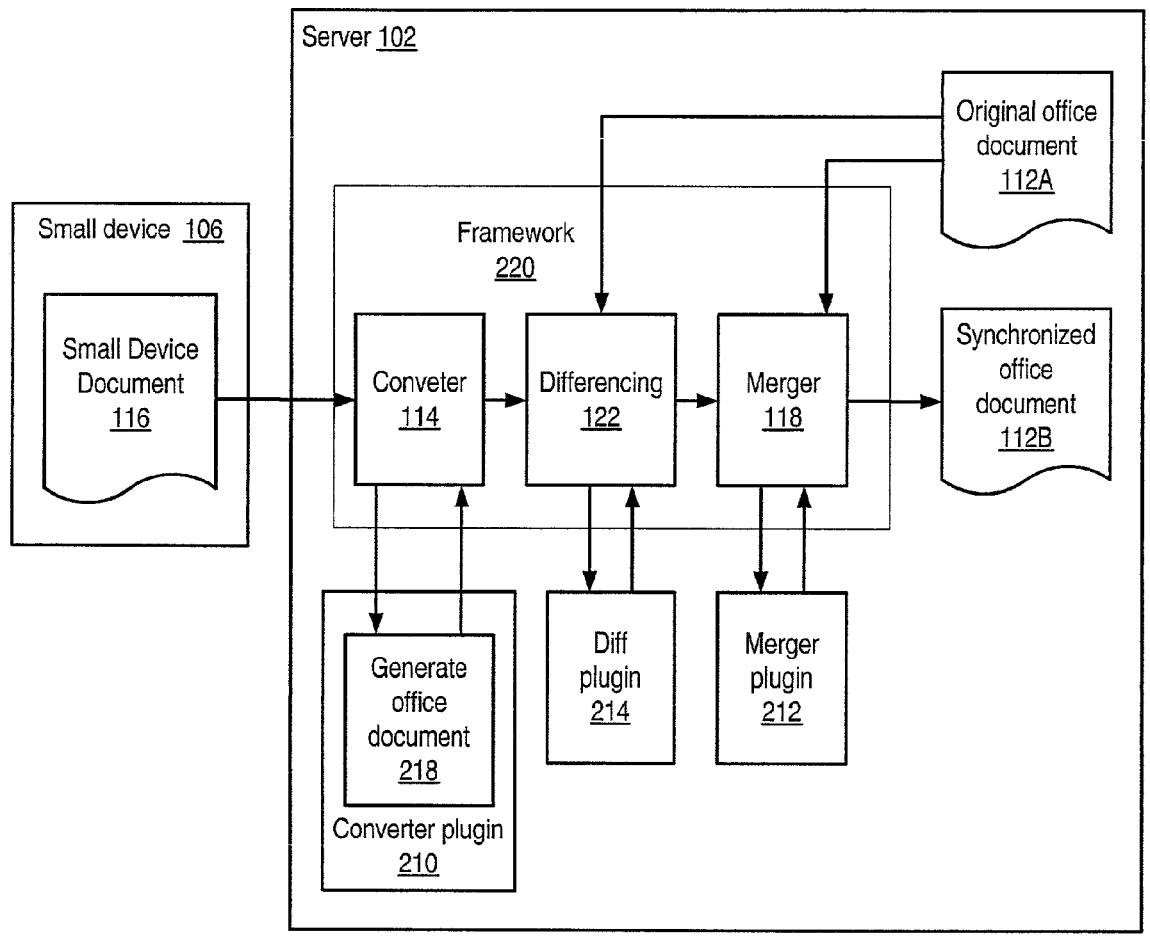
FIG. 7B illustrates a conversion framework for pluggable modules being used to synchronize an office document with a modified small device document according to one embodiment.

FIG. 7A illustrates a conversion framework for pluggable modules being used to convert an office document to a small device document according to one embodiment. FIG. 7B illustrates a conversion framework for pluggable modules being used to synchronize an office document with a modified small device document according to one embodiment. In one embodiment, the conversion, differencing and/or merge processes may be implemented using pluggable modules that plug into a general infrastructure or framework 220. In this embodiment, framework 220 may be used for document conversion that allows individual document converter plug-in modules 210, merger plug-in modules 212 and/or differencing plug-in modules 214 to be added, updated or replaced as needed. In one embodiment, the modules may be plugged into the framework 220 dynamically at runtime, without having to restart the server 102 and/or office productivity applications that may be executing within the server 102. In one embodiment, a plug-in module of one type may be used with two or more different modules of another type; for example, a particular merger module 212 may be used with two or more different converter modules 210.

In FIG. 7A, a synchronization process may be instantiated from small device 106, or optionally from server 102. If there is an office document 112 that needs to be copied from the server 102 to the small device 106, the office document 112 may be passed to converter 114. Converter 114 may call or access the converter plug-in 210 to generate the small device document 116 from the office document 112. One or more formats and/or content of the office document may be lost during the conversion process. In one embodiment, converter 114 may convert some parts of the document that are common among a variety of office document formats.

In FIG. 7B, a synchronization process may be instantiated from small device 106, or optionally from server 102. If there is a small device document 116 to be synchronized with an office document 112A, the small device document 116 may be passed to converter 114. Converter 114 may call or access the converter plug-in 210 to convert the small device document 116 to the office document format In one embodiment, converter 114 may convert some parts of the document that are common among a variety of office document formats. The converted document may be passed to the differencing module 122, which may determine differences, if any, between the converted small office document and the original office document 112A. Merger 118 may generate the synchronized office document 112B from the determined differences and the original office document 112A by merging the changes into the original office document 112A. Alternatively, the changes may be merged into a copy of the original office document 112A. After the synchronized office document 112B is generated, it may be converted into a small office document and sent to the small device 106, for example by a method similar to that illustrated in FIG. 7A.

In one embodiment, the differencing and merger modules may work together for a specific document interim format. In this embodiment, converter 114 would output the small device document 116 into the interim format, and the office document 112A would be converted into the interim format (if it is not already in the interim format). The output of the merger would be a synchronized document in the interim format. This document may then be converted into one or more other formats, including the original office document format and the small device format.

In one embodiment, the framework may also support pluggable iterator modules, and one or more iterator modules (as illustrated in FIG. 4) may also be implemented to plug into the framework in support of the differencing/merger modules.

In one embodiment, one or more of the iterator(s), differencing and/or merger modules that support a specific document format may be reused in other implementations of conversion and merging.

In one embodiment, the framework 220 may provide a generic Application Programming Interface (API), through which one or more of the plug-ins may be plugged into the framework 220. The plug-in modules for converting, differencing and/or merging documents of various formats may interface with the framework 220 via the API. In one embodiment, one or more default plug-in modules may be provided, and third-party vendors may develop custom plug-in modules that interface with the APIs to support custom synchronization tasks. In one embodiment, the plug-in architecture of the framework 220 may allow for the plugging-in of more sophisticated algorithms to support document conversion, differencing and merging of documents created or edited on more sophisticated devices.

The plug-in architecture of the framework 220 may allow the document conversion capabilities of an office productivity environment to be extended over time as needed. In one embodiment, the framework may be configured to perform portions of the conversion process that are common among some or all of the document converters, mergers, and/or differencing mechanisms, allowing the plug-in modules to focus on tasks specific to the particular application formats and thus preferably minimizing the replication of functionality.

In one embodiment, the framework 220 may support the plugging in of two or more plug-in modules in a chain or series. For example, a first converter plug-in 214 may be used convert a document from a first format to a second format and then a second converter plug-in 214 may be used to convert the document from the second format to a third format.

In one embodiment, the framework 220, converter module 114, differencing module 122 and/or merger module 118 may be based on open standards, for example XML and the OpenOffice document formats. In one embodiment, the framework 220 and/or plug-in modules may be written in a platform-independent language, such as Java, to allow the processes to run on different platforms including, but not limited to, Microsoft Windows, Apple Macintosh OS, Linux, and Sun Solaris. One embodiment may be implemented using the Java programming language, and thus may be run on any platform that supports the Java Virtual Machine (JVM). One skilled in the art will recognize that any of a variety of other programming languages may be used to implement embodiments, for example, C, C++, Fortran, and assembly language, among others.

In one embodiment, the synchronization and conversion processes may use a framework 220 that is configurable to use any of a variety of front-ends, for example, email, HTTP, SyncML, WebDAV, SOAP and ebXML, among others. For example, in one embodiment with an email front-end, a user of a client device may email documents to a particular synchronization implementation based on the framework 220, which then may email the results (synchronized documents) back to the client device.

In one embodiment, a stand-alone converter mechanism that is not part of framework 220 may interface with the framework to diff/merge results of the converter with an original document. Alternatively, a stand-alone diff/merger implementation that is not part of the framework 220 may interface with the framework to convert documents prior to or after diff/merging. For example, an office productivity system may provide a converter filter to convert from a format A to a format B. The converter filter may be used to handle conversions, and the stand-alone diff/merger may provide merging capabilities for the converter filter.

Figure 8A:
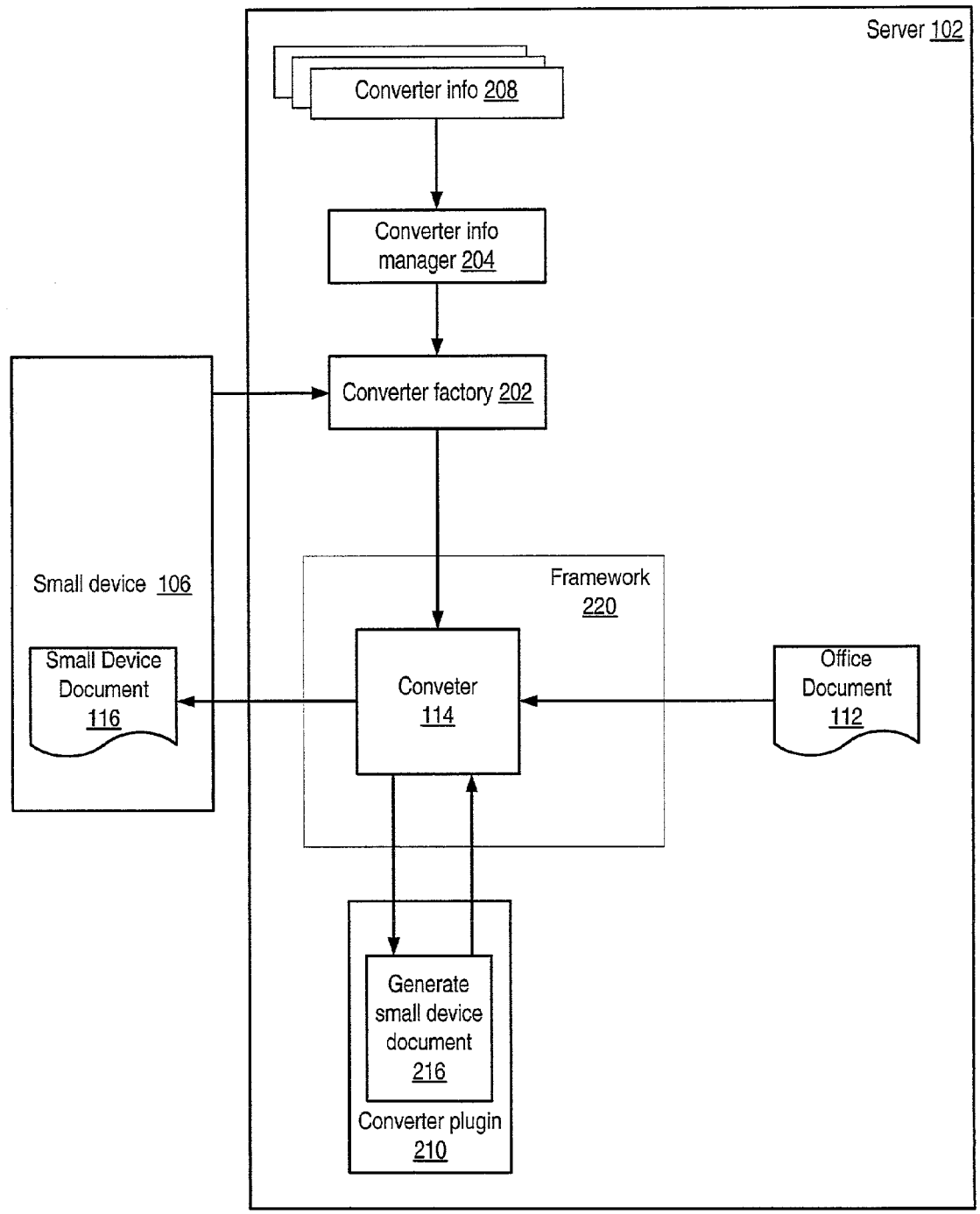
FIG. 8A illustrates a conversion framework for pluggable modules being used to convert an office document to a small device document with a converter factory interface for creating objects used in the conversions according to one embodiment.
Figure 8B:
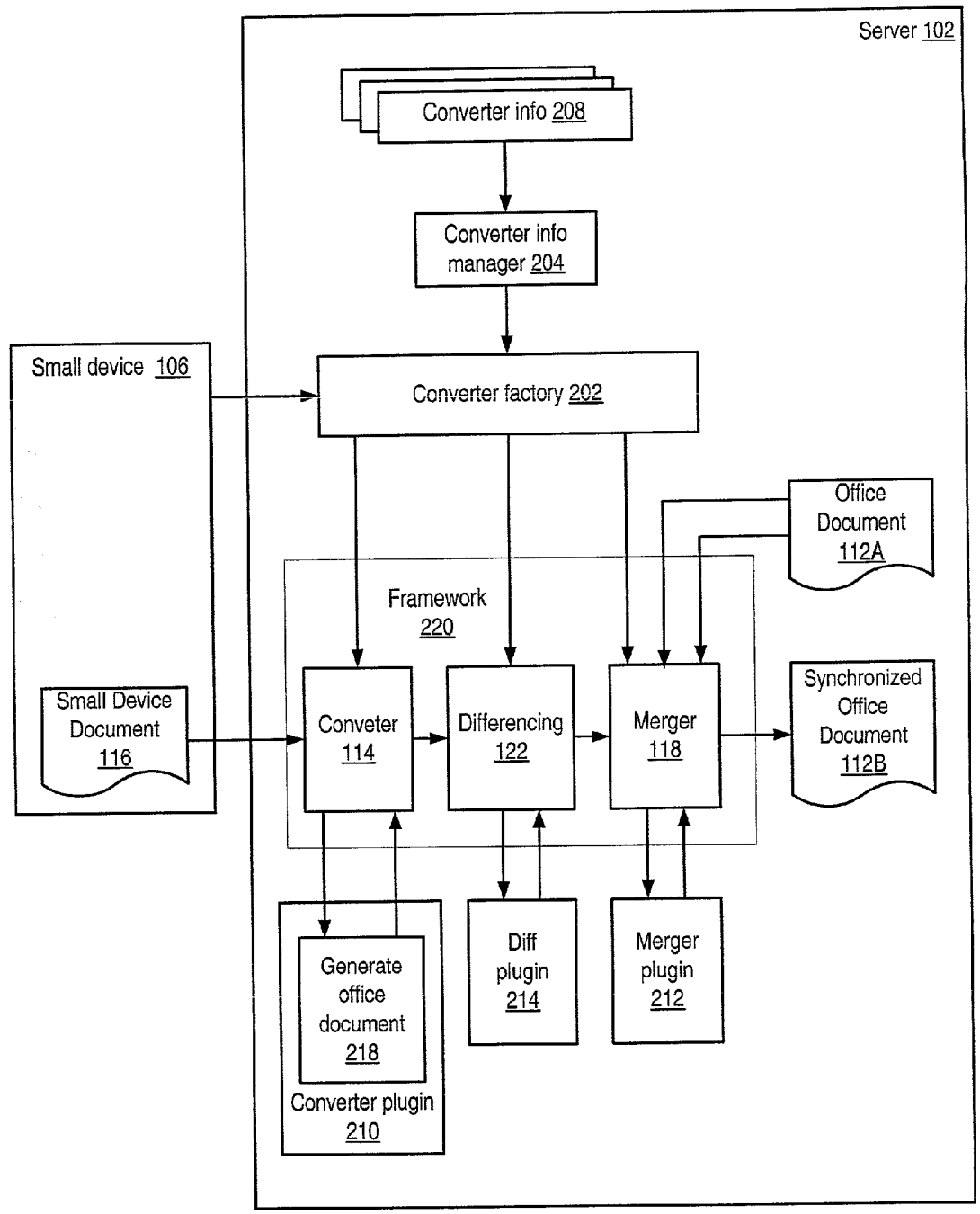
FIG. 8B illustrates a conversion framework for pluggable modules being used to synchronize an office document with a modified small device document with a converter factory interface for creating objects used in the conversions according to one embodiment.

FIGS. 8A and 8B illustrate the conversion framework for pluggable modules converting an office document to and from a small device document with a converter factory interface for creating objects used in the conversions according to one embodiment. In one embodiment, a converter factory interface 202 may be defined that may be used to create some or all of the objects necessary to perform the conversion of documents in one or more document formats to and from documents in one or more other document formats. An implementation of the factory interface 202 may be used to create the various objects (e.g. plug-in modules) that may be used in the conversion and synchronization processes and that optionally may be used in merging changes made on the small device document back to the original server document. In one embodiment, a synchronization process initiated from small device 106 may cause the converter factory 202 to create one or more objects (e.g. plug-in modules) to be used in the synchronization process.

In FIG. 8A, a synchronization process may be instantiated from small device 106, or optionally from server 102. The synchronization process initiated from small device 106 may cause the converter factory 202 to create one or more objects (e.g. plug-in modules) to be used in the synchronization process. If there is an office document 112 that needs to be copied from the server 102 to the small device 106, the office document 112 may be passed to converter 114. Converter 114 may call or access the converter plug-in 210 to generate the small device document 116 from the office document 112. One or more formats and/or content of the office document may be lost during the conversion process. In one embodiment, converter 114 may convert some parts of the document that are common among a variety of office document formats.

In FIG. 8B, a synchronization process may be instantiated from small device 106, or optionally from server 102. The synchronization process initiated from small device 106 may cause the converter factory 202 to create one or more objects (e.g. plug-in modules) to be used in the synchronization process. If there is a small device document 116 to be synchronized with an office document 112A, the small device document 116 may be passed to converter 114. Converter 114 may call or access the converter plug-in 210 to convert the small device document 116 to the office document format. In one embodiment, converter 114 may convert some parts of the document that are common among a variety of office document formats. The converted document may be passed to the differencing module 122, which may determine differences between the converted small office document and the original office document 112A, if any. Merger 118 may generate the synchronized office document 112B from the determined differences and the original office document 112A by merging the changes into the original office document 112A. Alternatively, the changes may be merged into a copy of the original office document 112A. After the synchronized office document 112B is generated, it may be converted into a small office document and sent to the small device 106, for example by a method similar to that illustrated in FIG. 8A.

In one embodiment, converter information 208 may include information for generating one or more converter implementations that are each available on the system to convert documents in one or more formats to and from one or more other formats. Converter information manager 204 may interface with the converter factory 202 to provide particular converter information 208 to the converter factory for use in generating the one or more objects required in a particular converter implementation.

Note that while FIG. 8B shows the converter 114, differencing module 122 and merger 118 as separate processes, in one embodiment one or more of these modules may be implemented as a combined module. Similarly, one or more of the plug-in modules may be implemented as a combined module.

The following is one embodiment of exemplary code for converting an office document 112 into a small device document 116 using a converter factory 202 as illustrated in FIG. 8A, and is included for illustrative purposes only and is not intended to be limiting. The code illustrates one embodiment of an implementation of a converter factory 202:

ConverterFactory cf=new ConverterFactoryImpl( );
Document doc=cf.createDocument("Sample Document", fileInputStream);
DocumentSerializer sconverter=cf.createDocumentSerializer(doc);
sconverter.serialize(outputstream);

"Sample Document" is the document name of the file. fileInputStream is an InputStream object of the file to be converted. outputstream is an OutputStream object that the converted bytes are written into. The DeviceSerializer object, created from the ConverterFactory object, may be used to convert a document object created from the same ConverterFactory.

The following is exemplary code for converting a small device document 116 to an office document with the option of providing merge functionality using a converter factory 202 as illustrated in FIG. 8B, and is included for illustrative purposes only and is not intended to be limiting:

```
ConverterFactory cf = new ConverterFactoryImpl( );
DocumentDeserializer dconverter =
cf.createDocumentDeserializer( deviceInputStream );
Document modifiedDoc = dconverter.deserialize( );
// merge to the original Document object
if ( cf.isMergeSupported( ) )
{
    Document origDoc = cf.createDocument( docName,
        fileInputStream );
    DocumentMerger merger = cf.createDocumentMerger( origDoc );
    try
    {
        merger.merge( modifiedDoc );
        origDoc.write( fileOutputStream );
    }
    catch ( MergeException e )
```

-continued

```
    {
        modifiedDoc.write( fileOutputStream );
    }
}
else
{
    modifiedDoc.write( fileOutputStream );
}
```

This code instantiates a ConverterFactory to revert the document to the server format. The DeviceDeserializer object created from the ConverterFactory may convert an InputStream object that includes the device document to a Document object, the type of which is particular to this ConverterFactory type. After the conversion, the converted document directory may be written to an OutputStream. Since the conversion from server document to small device document format may be lossy, this reverse conversion may produce a server document that includes only what is in the device document. A DocumentMerger object created from the ConverterFactory object may determine the changes done on the small device document 116 based on the original server document 112, and also may merge the changes into the given original server document object. If the merging process throws an Exception, the contents of the converted, modified document may still be written out. Some implementations may not supply the merging capability, thus a check may be performed using the method isMergeSupported to determine if the implementation provides merging capability.

The following is another embodiment of exemplary code for converting a small device document 116 to an office document with the option of providing merge functionality using a converter factory 202 as illustrated in FIG. 8B, and is included for illustrative purposes only and is not intended to be limiting:

The following code sample may be used for registering a specific plug-in:

ConverterInfoReader cir=
new ConverterInfoReader ("*file:///path_to_jar/myPlugIn.jar", false);
Enumeration jarInfoEnumeration=cir.getConverterInfoEnumeration( );
ConverterInfoMgr.addPlugIn(jarInfoEnumeration);

An example of interacting with the ConvertData and Convert classes follows:

```
ConverterFactory cf = new ConverterFactory( );
Convert conv = cf.getConverter("staroffice/sxw",
    "destination_mime_type");
FileInputStream fis = new FileInputStream("fileToConvert.sxw");
conv.addInputStream(processFile, fis);
ConvertData dataOut = conv.convert( );
Enumeration docEnum = dataOut.getDocumentEnumeration( );
while (docEnum.hasMoreElements( )) {
    Document docOut = (Document)docEnum.nextElement( );
    String fileName = docOut.getFileName( );
    FileOutputStream fos = new FileOutputStream(fileName);
    docOut.write(fos);
}
```

An example of interacting with the DocumetnMerger object follows:

```
String mergeFile = "origDoc.sxw";
FileInputStream mergeIS = new FileInputStream(mergeFile);
Document mergeDoc = myConvert.getOfficeDocument(mergeFile,
mergeIS);
DocumentMerger merger = myConvert.getDocumentMerger(mergeDoc);
// if merger is null, then merge is not supported
if (merger != null) {
    // dataOut is the device file converted to an OfficeDocument, the
    // output of the Convert.convert method.
    Enumeration mergeEnum = dataOut.getDocumentEnumeration( );
    Document converted = (Document)mergeEnum.nextElement( );
    merger.merge(convertedFile);
    String fileName = converted.getFileName( );
    FileOutputStream fos = new FileOutputStream(fileName);
    mergeDoc.write(fos);
}
```

Since the conversion of a document formatted for use in an office productivity environment to a document formatted for use on small devices may incur data loss, a merger may need information regarding the conversion process. One embodiment may use an interface design pattern to allow converter developers to provide custom converter and merger implementations with any necessary interaction between their converter algorithm and merge algorithm. A converter developer may implement the factory interface required to produce converters in both directions and a document merger. In some instances, a merger may not be required or desired, and the absence of the merger may be indicated to the factory implementation.

Note that while the plug-in architecture is described generally in regards to converting between small device documents and office documents on a server, embodiments may be applied to a number of other applications and environments. For example, one embodiment may be applied to converting documents to and from a workstation and a server. As another example, one embodiment may be used within a single device (e.g. a workstation, server or small device) to convert documents from one format to another for use within the device.

Conclusion

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for synchronizing client documents and office documents have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
a server comprising a document in a format supported by the server, wherein the document is available to one or more devices via a network in the format supported by the server;
a small device configured to couple to the server;
wherein the server is configured to generate a small device document in a format supported by the small device from the document in the format supported by the server, wherein the format supported by the small device excludes one or more formats for content of the document in the format supported by the server;
wherein the small device is further configured to modify the small device document; and
wherein the server is further configured to synchronize the document in the format supported by the server with a modified version of the small device document on the small device.

2. The system as recited in claim 1, wherein the document in the format supported by the server is a non-record-oriented office productivity document.

3. The system as recited in claim 1, wherein, to generate a small device document in a format supported by the small device from the document in the format supported by the server, the server is further configured to exclude one or more formats for content of the document in the format supported by the server from the small device document.

4. The system as recited in claim 1, wherein, to synchronize the document in the format supported by the server with a modified version of the small device document on the small device, the server is further configured to restore one or more formats for content of the document in the format supported by the server excluded from the small device document.

5. The system as recited in claim 1, wherein, to synchronize the document in the format supported by the server with a modified version of the small device document on the small device, the server is further configured to:
determine one or more formats for content of the modified version of the small device document to be merged with the document in the format supported by the server; and
merge the content of the modified version of the small device document into the document in the format supported by the server in accordance with the determined one or more formats for the content.

6. The system as recited in claim 1, wherein, to synchronize the document in the format supported by the server with a modified version of the small device document on the small device, the server is further configured to:
compare modified content of the modified version of the small device document to corresponding content of the document in the format supported by the server to determine one or more formats for the modified content of the modified version of the small device document to be merged with the document in the format supported by the server; and
merge the modified content of the modified version of the small device document into the document in the format supported by the server in accordance with the determined one or more formats for the modified content.

7. The system as recited in claim 1, wherein, to synchronize the document in the format supported by the server with a modified version of the small device document on the small device, the server is further configured to generate a synchronized version of the document in the format supported by the server from the document in the format supported by the server and the modified version of the document.

8. The system as recited in claim 1, wherein, to synchronize the document in the format supported by the server with the modified version of the small device document, the server is further configured to:
  determine one or more differences between the modified version of the small device document and the document in the format supported by the server; and
  merge the determined one or more differences with content of the document in the format supported by the server to generate a synchronized version of the document in the format supported by the server.

9. The system as recited in claim 8, wherein, to determine one or more differences between the modified version of the small device document and the document in the format supported by the server, the server is further configured to:
  generate a modified document in the format supported by the server from the modified version of the small device document; and
  compare the modified document in the format supported by the server to the document in the format supported by the server.

10. The system as recited in claim 1, wherein, to synchronize the document in the format supported by the server with the modified version of the small device document, the server is further configured to:
  generate a modified document in an interim format from the modified version of the small device document;
  generate a document in the interim format from the document in the format supported by the server;
  determine one or more differences between the modified document in the interim format and the document in the interim format; and
  merge the determined one or more differences with content of the document in the interim format to generate a synchronized version of the document in the interim format.

11. The system as recited in claim 10, wherein the server is further configured to generate a synchronized version of the document in the format supported by the server from the synchronized version of the document in the interim format.

12. A server, comprising:
  a processor;
  a memory storing program instructions, wherein the program instructions are executable by the processor to:
  generate a small device document in a format supported by one or more small devices from an original document in a format supported by the server, wherein one or more formats for content of the original document not supported by the one or more small devices are excluded from the small device document;
  provide the small device document to one of the one or more small devices coupled to the server;
  receive the modified version of the small device document from the small device; and
  generate a synchronized version of the original document from a modified version of the small device document.

13. The server as recited in claim 12, wherein the original document is a non-record-oriented office productivity document.

14. The server as recited in claim 12, wherein, to generate a synchronized version of the original document from a modified version of the small device document, the program instructions are further executable by the processor to restore in the synchronized version of the original document at least one of the one or more formats for content of the original document excluded from the small device document.

15. The server as recited in claim 12, wherein, to generate a synchronized version of the original document from a modified version of the small device document, the program instructions are further executable by the processor to:
  determine one or more formats for content of the modified version of the small device document to be merged with the document in the format supported by the server; and
  merge the content of the modified version of the small device document into the original document in accordance with the determined one or more formats for the content.

16. The server as recited in claim 12, wherein, to synchronize the original document with a modified version of the small device document on the small device, the server is further configured to:
  compare modified content of the modified version of the small device document to corresponding content of the original document to determine one or more formats for the modified content of the modified version of the small device document to be merged with the document in the format supported by the server; and
  merge the modified content of the modified version of the small device document into the original document in accordance with the determined one or more formats for the modified content.

17. The server as recited in claim 12, wherein, to generate a synchronized version of the original document from a modified version of the small device document, the program instructions are further executable by the processor to:
  determine one or more differences between the modified version of the small device document and the original document; and
  merge the one or more differences with content of the original document to generate a synchronized version of the document in the format supported by the server.

18. The server as recited in claim 17, wherein, to determine one or more differences between the modified version of the small device document and the document in the format supported by the server, the server is further configured to:
  generate a modified document in the format supported by the server from the modified version of the small device document; and
  compare the modified document in the format supported by the server to the original document.

19. The server as recited in claim 12, wherein, to generate a synchronized version of the original document from a modified version of the small device document, the program instructions are further executable by the processor to:
  generate a modified document in an interim format from the modified version of the small device document;
  generate a document in the interim format from the original document;
  determine one or more differences between the modified document in the interim format and the document in the interim format; and
  merge the determined one or more differences with content of the document in the interim format to generate a synchronized version of the document in the interim format.

20. The server as recited in claim 19, wherein the program instructions are further executable by the processor to generate a synchronized version of the document in the format supported by the server from the synchronized version of the document in the interim format.

21. A method, comprising:
generating a small device document in a format supported by a small device from a non-record-oriented office productivity document in a format supported by an office productivity server, wherein the format supported by the small device excludes one or more formats for content of the non-record-oriented office productivity document in the format supported by the office productivity server;
modifying the small device document to generate a modified version of the small device document;
determining one or more differences between the modified version of the small device document and the non-record-oriented office productivity document; and
merging the one or more differences with content of the non-record-oriented office productivity document to generate a synchronized version of the non-record-oriented office productivity document;
wherein said generating a small device document, said determining one or more differences, and said merging the one or more differences with content of the non-record-oriented office productivity document are performed within the office productivity server.

22. The method as recited in claim 21, wherein said determining one or more differences between the modified version of the small device document and the office productivity document comprises:
generating a modified office productivity document in the format supported by the server from the modified version of the small device document; and
comparing the modified office productivity document to the original office productivity document to determine the one or more differences.

23. The method as recited in claim 21, wherein said generating a small device document in a format supported by the small device from the office productivity document comprises excluding one or more formats for content of the office productivity document from the small device document.

24. The method as recited in claim 21, wherein said merging the one or more differences with content of the office productivity document to generate a synchronized version of the office productivity document comprises restoring one or more formats for content of the office productivity document excluded from the small device document.

25. The method as recited in claim 21, wherein said merging the one or more differences with content of the office productivity document to generate a synchronized version of the office productivity document comprises:
determining one or more formats for content of the modified version of the small device document to be merged with the office productivity document; and
merging the content of the modified version of the small device document into the office productivity document in accordance with the determined one or more formats for the content.

26. The method as recited in claim 21, wherein said merging the one or more differences with content of the office productivity document to generate a synchronized version of the office productivity document comprises:
comparing modified content of the modified version of the small device document to corresponding content of the office productivity document to determine one or more formats for the modified content of the modified version of the small device document to be merged with the office productivity document; and
merging the modified content of the modified version of the small device document into the office productivity document in accordance with the determined one or more formats for the modified content.

27. The method as recited in claim 21, wherein said modifying the small device document is performed within the small device.

28. The method as recited in claim 21, further comprising:
generating a modified document in an interim format from the modified version of the small device document;
generating a document in the interim format from the office productivity document;
wherein said determining one or more formats for content of the modified version of the small device document to be merged with the office productivity document comprises determining one or more differences between the modified document in the interim format and the document in the interim format; and
wherein said merging the content of the modified version of the small device document into the office productivity document in accordance with the determined one or more formats for the content comprises merging the determined one or more differences with content of the document in the interim format to generate a synchronized version of the document in the interim format.

29. A computer-readable storage medium comprising program instructions wherein the program instructions are computer-executable to implement:
generating a small device document in a format supported by a small device from a non-record-oriented office productivity document in a format supported by an office productivity server, wherein the format supported by the small device excludes on or more formats for content of the non-record-oriented office productivity document in the format supported by the office productivity server;
modifying the small device document to generate a modified version of the small device document;
determining one or more differences between the modified version of the small device document and the non-record-oriented office productivity document; and
merging the one or more differences with content of the non-record-oriented office productivity document to generate a synchronized version of the non-record-oriented office productivity document;
wherein said generating a small device document, said determining one or more differences, and said merging the one or more differences with content of the non-record-oriented office productivity document are performed within the office productivity server.

30. A computer-readable storage medium recited in claim 29, wherein, in said determining one or more differences between the modified version of the small device document and the office productivity document, the program instructions are further computer-executable to implement:
generating a modified office productivity document in the format supported by the server from the modified version of the small device document; and
comparing the modified office productivity document to determine the one or more differences.

31. A computer-readable storage medium recited in claim 29, wherein, in said generating a small device document in a format supported by the small device from the office productivity document, the program instructions are further computer-executable to implement excluding one or more formats for content of the office productivity document from the small device document.

32. A computer-readable storage medium recited in claim 29, wherein, in said merging the one or more differences with content of the office productivity document to generate a synchronized version of the office productivity document, the program instructions are further computer-executable to implement restoring one or more formats for content of the office productivity document excluded from the small device document.

33. A computer-readable storage medium recited in claim 29, wherein, in said merging the one or more differences with content of the office productivity document to generate a synchronized version of the office productivity document, the program instructions are further computer-executable to implement:
   determining one or more formats for content of the modified version of the small device document to be merged with the office productivity document; and
   merging the content of the modified version of the small device document into the office productivity document in accordance with the determined one or more formats for the content.

34. A computer-readable storage medium recited in claim 29, wherein, in said merging the one or more differences with content of the office productivity document to generate a synchronized version of the office productivity document, the program instructions are further computer-executable to implement:
   comparing modified content of the modified version of the small device document to corresponding content of the office productivity document to determine one or more formats for the modified content of the modified version of the small device to be merged with the office productivity document; and
   merging the content of the modified version of the small device document into the office productivity document in accordance with the determined one or more formats for the content.

35. A computer-readable storage medium recited in claim 29, wherein, said modifying the small device document is performed within the small device.

36. A computer-readable storage medium comprising program instructions wherein the program instructions are computer-executable to implement:
   generating a modified document in an interim format from the modified version of the small device document;
   generating a document in the interim format from the office productivity document;
   wherein said determining one or more format for content of the modified version of the small device document to be merged with the with the office productivity document comprises determining one or more differences between the modified document in the interim format and the document in the interim format; and
   wherein said merging the content of the modified version of the small device document into the office productivity document in accordance with the determined one or more formats for the content comprises merging the determined one or more differences with content of the document in the interim format to generate a synchronized version of the document in the interim format.

* * * * *